(12) United States Patent
Sengupta et al.

(10) Patent No.: US 12,229,512 B2
(45) Date of Patent: Feb. 18, 2025

(54) SIGNIFICANCE-BASED PREDICTION FROM UNSTRUCTURED TEXT

(71) Applicant: Optum, Inc., Minnetonka, MN (US)

(72) Inventors: Ayan Sengupta, Noida (IN); Saransh Chauksi, Noida (IN); Zhijing J. Liu, Audubon, PA (US)

(73) Assignee: Optum, Inc., Minnetonka, MN (US)

( * ) Notice: Subject to any disclaimer, the term of this patent is extended or adjusted under 35 U.S.C. 154(b) by 589 days.

(21) Appl. No.: 17/461,649

(22) Filed: Aug. 30, 2021

(65) Prior Publication Data

US 2023/0061731 A1    Mar. 2, 2023

(51) Int. Cl.
   *G06F 40/284*    (2020.01)
(52) U.S. Cl.
   CPC .................................. *G06F 40/284* (2020.01)
(58) Field of Classification Search
   CPC .......... G06N 20/00; G06N 3/09; G06N 5/022; G06N 3/045; G06N 5/04; G06N 3/08; G06N 20/20; G06N 3/044; G06N 3/0442; G06N 3/0464; G06N 3/0455; G06N 3/088; G06N 5/01; G06N 5/02; G06N 3/047; G06N 3/0985; G06N 3/084; G06N 5/027; G06N 7/08; G06N 3/082; G06F 40/30; G06F 40/284; G06F 16/93; G06F 40/279; G06F 40/166; G06F 16/285; G06F 16/3346; G06F 16/35; G06F 16/353; G06F 16/36; G06F 16/9024; G06F 40/20; G06F 16/3329; G06F 16/3344; G06F 16/345; G06F 16/355; G06F 16/906; G06F 40/295; G06F 40/40; G06F 16/3334; G06F 16/358;
   (Continued)

(56) References Cited

U.S. PATENT DOCUMENTS 5,664,109 A    9/1997    Johnson et al.
7,505,621 B1   3/2009    Agrawal et al.
(Continued)

OTHER PUBLICATIONS

"Amazon Comprehend Medical," Amazon Web Services (AWS), (7 pages), (online), [Retrieved from the Internet Nove. 27, 2021] <URL: https://aws.amazon.com/comprehend/medical/>.
(Continued)

*Primary Examiner* — Angela A Armstrong
(74) *Attorney, Agent, or Firm* — Alston & Bird LLP

(57) ABSTRACT

Various embodiments provide methods, apparatus, systems, computing entities, and/or the like, generating predictions based at least in part on recognizing significant words in unstructured text. In an embodiment, a method is provided. The method comprises: generating a plurality of word-level tokens for an input unstructured textual data object; and for each word-level token: determining a significance type and a significance subtype for the word-level token by using a significance recognition machine learning model, and assigning a significance token label or an insignificance token label to the word-level token. The method further comprises: generating a label-based feature data object based at least in part on a subset of word-level tokens associated with the significance token label; generating a prediction data object for the input unstructured textual data object by providing the label-based feature data object to a first prediction machine learning model; and performing one or more automated prediction-based actions.

20 Claims, 9 Drawing Sheets

(58) Field of Classification Search
CPC .. G06F 16/383; G06F 16/5846; G06F 40/194; G06F 40/289; G06F 9/50; G06V 30/19173; G06V 30/413; G06V 30/414; G06V 10/25; G06V 10/764; G06V 30/19; G06V 30/41; G10L 15/26; H04L 12/1831; H04L 51/02; G06Q 30/0205

See application file for complete search history.

(56) References Cited

U.S. PATENT DOCUMENTS

| | | | |
|---|---|---|---|
| 8,538,780 | B1 | 9/2013 | Sweeney et al. |
| 9,961,070 | B2 | 5/2018 | Tang |
| 10,861,589 | B2 | 12/2020 | Waits |
| 2005/0234740 | A1 | 10/2005 | Krishnan et al. |
| 2011/0093293 | A1 | 4/2011 | G. N. et al. |
| 2013/0191137 | A1 | 7/2013 | Chen et al. |
| 2013/0197925 | A1 | 8/2013 | Blue |
| 2013/0339060 | A1 | 12/2013 | Delaney et al. |
| 2015/0193580 | A1 | 7/2015 | Mosier, III et al. |
| 2015/0205846 | A1 | 7/2015 | Aldridge et al. |
| 2015/0350148 | A1 | 12/2015 | Kenney et al. |
| 2019/0206524 | A1* | 7/2019 | Baldwin ............... G06F 40/169 |
| 2020/0167871 | A1 | 5/2020 | Basu et al. |
| 2023/0059494 | A1* | 2/2023 | Hunter ................. G06F 40/279 |

OTHER PUBLICATIONS

"CLAMP—Clinical Language Annotation, Modeling, and Processing Toolkit," (8 pages), (online), [Retrieved from the Internet Nov. 27, 2021] <URL: https://clamp.uth.edu/>.

"Industrial-Strength Natural Language Processing in Python," spaCy, (9 pages), (online), [Retrieved from the Internet Nov. 27, 2021] <URL: https://spacy.io/>.

"SpaCy Models For biomedical Text Processing," GitHub, (5 pages), (online), [Retrieved from the Internet Nov. 27, 2021] <URL: https://allenai.github.io/scispacy/>.

"Spark NLP—State of the Art Natural Language Processing," John Snow Labs, (11 pages), (online), [Retrieved from the Internet Nov. 27, 2021] <URL: https://nlp.johnsnowlabs.com/>.

Alsentzer, Emily et al. "Publicly Available Clinical BERT Embeddings," arXiv Preprint arXiv:1904.03323v3 [cs.CL] Jun. 20, 2019, (7 pages).

Arumae, Kristjan et al. "CALM: Continuous Adaptive Learning for Language Modeling," arXiv Preprint arXiv: 2004.03794v1 [cs.CL] Apr. 8, 2020, (7 pages).

Bahdanau, Dzmitry et al. "Neural Machine Translation By Jointly Learning to Align and Translate," arXiv Preprint arXiv: 1409.0473v1 [cs.CL] Sep. 1, 2014, pp. 1-15.

Bhatia, Parminder et al. "Joint Entity Extraction and Assertion Detection for Clinical Text," arXiv Preprint, arXiv:1812.05270v5 [cs.CL] Jan. 22, 2020, (6 pages).

Bindman, Andrew B. "Using the National Provider Identifier for Health Care Workforce Evaluation," Medicare & Medicaid Research Review, vol. 3, No. 3, (2013), pp. E1-E10, DOI: http://dx.doi.org/10.5600/mmrr.003.03.b03, ISSN: 2159-0354.

Bojanowski, Piotr et al. "Enriching Word Vectors with Subword Information," Transactions of the Association for Computational Linguistics, vol. 5, Jun. 2017, pp. 135-146.

Cao, Shilei et al. "Knowledge Guided Short-Text Classification for Healthcare Applications," in 2017 IEEE International Conference on Data Mining (ICDM), Nov. 18, 2017, pp. 31-40, IEEE.

Chiticariu, Laura et al. "Rule-Based Information Extraction Is Dead! Long Live Rule-Based Information Extraction Systems!," Proceedings of the 2013 Conference on Empirical Methods In Natural Language Processing, Oct. 18, 2013, pp. 827-832.

Chiu, Jason P.C. et al. "Named Entity Recognition With Bidirectional LSTM-CNNs," Transactions of the Association for Computational Linguistics, vol. 4, Jul. 2016, pp. 357-370.

Devlin, Jacob et al. "BERT: Pre-Training of Deep Bidirectional Transformers for Language Understanding," arXiv Preprint arXiv: 1810.04805v1 [cs.CL] Oct. 11, 2018, (14 pages).

Hughes, Mark et al. "Medical Text Classification Using Convolutional Neural Networks," Studies in Health Technology and Informatics, vol. 235, pp. 246-250, DOI: 10.3233/978-1-61499-753-5-246.

Jagannatha, Abhyuday N. et al. "Bidirectional RNN for Medical Event Detection in Electronic Health Records," in Proceedings of the Conference. Association for Computational Linguistics. North American Chapter. Meeting, vol. 2016, Jun. 2016, p. 473-482, NIH Public Access, DOI: 10.18653/v1/n16-1056, PMID: 27885364, PMCID: PMC5119627.

Lee, Jinhyuk et al. BioBERT: a Pre-Trained Biomedical Language Representation Model for Biomedical Text Mining, Bioinformatics, vol. 36, No. 4, Sep. 10, 2019, pp. 1234-1240, DOI: 10.1093/bioinformatics/btz682.

Li, Pengfei et al. "Improving Relation Extraction With Knowledge-Attention," Proceedings of the 2019 Conference on Empirical Methods in Natural Language Processing and the 9th International Joint Conference on Natural Language Processing, Nov. 3, 2019, pp. 229-230, Associate for Computational Linguistics.

Luong, Minh-Thang et al. "Effective Approaches to Attention-Based Neural Machine Translation," arXiv Preprint arXiv: 1508.04025v5 [cs.CL] Sep. 20, 2015, (11 pages).

Magge, Arjun et al. "Clinical NER and Relation Extraction Using Bi-Char-LSTMS and Random Forest Classifiers," in International Workshop on Medication and Adverse Drug Event Detection (pp. 25-30), vol. 20, May 16, 2018, pp. 25-30, Proceedings of Machine Learning Research.

Mikolov, Tomas et al. "Distributed Representations of Words and Phrases and Their Compositionality," Advances in Neural Information Processing Systems, vol. 26, Oct. 2013, (9 pages).

Mykowiecka, Agnieszka et al. "Rule-Based Information Extraction From Patients' Clinical Data," Journal of Biomedical Informatics, vol. 42, Jul. 29, 2009, pp. 923-936, DOI: 10.1016/j.jbi.2009.07.007.

Singh, Guarav et al. "Relation Extraction Using Explicit Context Conditioning," in Proceedings of the 2019 Conference of the North American Chapter of the Association for Computational Linguistics: Human Language Technologies, vol. 1 (Long and Short Papers), Jun. 2, 2019, pp. 1442-1447.

Vaswani, Ashish et al. "Attention Is All You Need," 31st Conference on Advances in Neural Information Processing Systems (NIPS 2017), Dec. 4, 2017, (11 pages).

Vu, Thanh et al. "A Label Attention Model for ICD Coding from Clinical Text," Proceedings of the Twenty-Ninth International Joint Conference on Artificial Intelligence (IJCAI-20), Jul. 9, 2020, pp. 3335-3341, DOI: 10.24963/ijcai.2020/461.

Whang, Taesun et al. "Domain Adaptive Training BERT for Response Selection," arXiv Preprint arXiv: 1908.04812v1 [cs.CL] Aug. 13, 2019, (7 pages).

Wu, Yonghui et al. "Clinical Named Entity Recognition Using Deep Learning Models," American Medical Informatics Association Annual Symposium Proceedings, vol. 2017, Apr. 16, 2018, pp. 1812-1819.

Xu, Guohai et al. "Improving Clinical Named Entity Recognition With Global Neural Attention," in Asia-Pacific Web (APWeb) and Web-Age Information Management (WAIM) Joint International Conference on Web and Big Data, Jul. 19, 2018, pp. 264-279, ). Springer, Cham, DOI: 10.1007/978-3-319-96893-3_20.

Zhang, Yijia et al. "BioWordVec, Improving Biomedical Word Embeddings With Subword Information and MeSH," Scientific Data, vol. 6, No. 52, May 10, 2019, pp. 1-9, DOI: 10.1038/s41597-019-0055-0.

Zhu, Ming et al. "LATTE: Latent Type Modeling for Biomedical Entity Linking," in Proceedings of the Thirty-Fourth AAAI Conference on Advancement of Artificial Intelligence (AAAI-20), vol. 34, No. 05, Apr. 3, 2020, pp. 9757-9764.

\* cited by examiner

FIG. 6

| Word | Entity | Page | Barcode |
|---|---|---|---|
| jonas | name | 1 | 84a944529118bc31e053c8d4770a3e37 |
| ivan | name | 1 | 84a944529118bc31e053c8d4770a3e37 |
| m | name | 1 | 84a944529118bc31e053c8d4770a3e37 |
| md | name | 1 | 84a944529118bc31e053c8d4770a3e37 |
| rel | other | 1 | 84a944529118bc31e053c8d4770a3e37 |
| to | other | 1 | 84a944529118bc31e053c8d4770a3e37 |
| guarantor | other | 1 | 84a944529118bc31e053c8d4770a3e37 |
| self | other | 1 | 84a944529118bc31e053c8d4770a3e37 |
| date | other | 1 | 84a944529118bc31e053c8d4770a3e37 |
| of | other | 1 | 84a944529118bc31e053c8d4770a3e37 |
| birth | other | 1 | 84a944529118bc31e053c8d4770a3e37 |
| 7131950 | other | 1 | 84a944529118bc31e053c8d4770a3e37 |

| Word | Entity | Page | Barcode |
|---|---|---|---|
| best | other | 1 | 84a944529118bc31e053c8d4770a3e37 |
| work | other | 1 | 84a944529118bc31e053c8d4770a3e37 |
| phone | other | 1 | 84a944529118bc31e053c8d4770a3e37 |
| address | other | 1 | 84a944529118bc31e053c8d4770a3e37 |
| 3060 | address | 1 | 84a944529118bc31e053c8d4770a3e37 |
| alton | address | 1 | 84a944529118bc31e053c8d4770a3e37 |
| road | address | 1 | 84a944529118bc31e053c8d4770a3e37 |
| city | other | 1 | 84a944529118bc31e053c8d4770a3e37 |
| state | other | 1 | 84a944529118bc31e053c8d4770a3e37 |
| zip | other | 1 | 84a944529118bc31e053c8d4770a3e37 |
| miami | address | 1 | 84a944529118bc31e053c8d4770a3e37 |
| beach | address | 1 | 84a944529118bc31e053c8d4770a3e37 |
| fl | address | 1 | 84a944529118bc31e053c8d4770a3e37 |
| 33140 | zip | 1 | 84a944529118bc31e053c8d4770a3e37 |

SIGNIFICANCE-BASED PREDICTION FROM UNSTRUCTURED TEXT

BACKGROUND

Various embodiments of the present disclosure address technical challenges related to processing, analysis, entity extraction, predictions, classifications, and/or the like using unstructured and unlabeled textual data.

BRIEF SUMMARY

In general, embodiments of the present disclosure provide methods, apparatus, systems, computing devices, computing entities, and/or the like for generating predictions based at least in part on labelling significant words in unstructured textual data. An exemplary application or scenario in which various embodiments of the present disclosure may be used or applied is the prediction of an identifier of a healthcare provider rendering healthcare services in a medical encounter described by an unstructured text based at least in part on labelling demographic information corresponding to the healthcare provider within unstructured textual data. External datasets may be generally referenced to recognize, identify, label, extract, and/or the like such significant information (e.g., the demographic information corresponding to the healthcare provider). While this exemplary application may be referenced throughout the present disclosure for descriptive context, it should be understood that various embodiments of the present disclosure may be applied generally to other prediction applications, information extraction applications, unstructured text analysis and labelling applications, and/or the like.

Various embodiments of the present disclosure utilize apparatuses, systems, methods, and computer program products to first recognize, identify, label, extract, and/or the like significant word-level tokens (e.g., demographic information) within unstructured text, generate a feature representation of the unstructured text using the recognized significant word-level tokens, and generate a prediction (e.g., a predicted identifier of a rendering healthcare provider) based at least in part on the feature representation. The recognition of significant word-level tokens may be accomplished using a significance recognition machine learning model that may be trained using external datasets to recognize significant word-level tokens. In various embodiments, the significance recognition machine learning model may be any machine learning model generally configured (e.g., trained) to recognize words with significant semantic meaning. Then, a prediction machine learning model may be configured to generate a prediction data object (e.g., a predicted identifier) using a representation of the unstructured text based at least in part on the significant word-level tokens. The prediction machine learning model may also be understood as a classification model (e.g., a machine learning model trained for classification tasks) configured or trained to classify or generate a prediction for a received representation of the unstructured text.

In accordance with one aspect of the present disclosure, a computer-implemented method is provided. The method includes generating a plurality of word-level tokens for an input unstructured textual data object. The method further includes, for each word-level token, determining, based at least in part on a word-level representation data object and a character-level representation data object and by using a significance recognition machine learning model, a significance type for the word-level token and a significance subtype for the word-level token. The significance recognition machine learning model is configured to, for each word-level token: (i) determine a word-level representation data object for the word-level token, (ii) determine a character-level representation data object for the word-level token, and (iii) determine the significance type for the word-level token and the significance subtype for the word-level token based at least in part on the word-level representation data object for the word-level token and the character-level representation data object for the word-level token. The method further includes, for each word-level token: assigning one of a significance token label or an insignificance token label to the word-level token based at least in part on at least one of the significance type for the word-level token and the significance subtype for the word-level token.

The method further includes generating a label-based feature data object for the input unstructured textual data object based at least in part on a subset of word-level tokens from the plurality of word-level tokens. Each word-level token of the subset is associated with the significance token label. The method further includes generating a prediction data object for the input unstructured textual data object based at least in part on providing the label-based feature data object to a first prediction machine learning model and performing one or more automated prediction-based actions.

In accordance with another aspect, a computer program product is provided. The computer program product may include at least one computer-readable storage medium having computer-readable program code portions stored therein. The computer-readable program code portions includes executable portions configured to cause at least one processor to generate a plurality of word-level tokens for an input unstructured textual data object. The computer-readable program code portions includes executable portions configured to cause at least one processor to further, for each word-level token, determine, based at least in part on a word-level representation data object and a character-level representation data object and by using a significance recognition machine learning model, a significance type for the word-level token and a significance subtype for the word-level token. The significance recognition machine learning model is configured to, for each word-level token: (i) determine a word-level representation data object for the word-level token, (ii) determine a character-level representation data object for the word-level token, and (iii) determine the significance type for the word-level token and the significance subtype for the word-level token based at least in part on the word-level representation data object for the word-level token and the character-level representation data object for the word-level token. The computer-readable program code portions includes executable portions configured to cause at least one processor to further, for each word-level token, assign one of a significance token label or an insignificance token label to the word-level token based at least in part on at least one of the significance type for the word-level token and the significance subtype for the word-level token.

The computer-readable program code portions includes executable portions configured to cause at least one processor to further generate a label-based feature data object for the input unstructured textual data object based at least in part on a subset of word-level tokens from the plurality of word-level tokens. Each word-level token of the subset is associated with the significance token label. The computer-readable program code portions includes executable portions configured to cause at least one processor to generate a prediction data object for the input unstructured textual data object based at least in part on providing the label-based feature data object to a first prediction machine learning model and perform one or more automated prediction-based actions.

In accordance with yet another aspect, an apparatus including a processor and at least one memory including computer program code is provided. In various embodiments, the at least one memory and the computer program code are configured to, with the processor, cause the apparatus to generate a plurality of word-level tokens for an input unstructured textual data object. The at least one memory and the computer program code are configured to, with the processor, cause the apparatus to further, for each word-level token, determine, based at least in part on a word-level representation data object and a character-level representation data object and by using a significance recognition machine learning model, a significance type for the word-level token and a significance subtype for the word-level token. The significance recognition machine learning model is configured to, for each word-level token: (i) determine a word-level representation data object for the word-level token, (ii) determine a character-level representation data object for the word-level token, and (iii) determine the significance type for the word-level token and the significance subtype for the word-level token based at least in part on the word-level representation data object for the word-level token and the character-level representation data object for the word-level token. The at least one memory and the computer program code are configured to, with the processor, cause the apparatus to further, for each word-level token, assign one of a significance token label or an insignificance token label to the word-level token based at least in part on at least one of the significance type for the word-level token and the significance subtype for the word-level token.

The at least one memory and the computer program code are configured to, with the processor, cause the apparatus to further generate a label-based feature data object for the input unstructured textual data object based at least in part on a subset of word-level tokens from the plurality of word-level tokens. Each word-level token of the subset is associated with the significance token label. The at least one memory and the computer program code are configured to, with the processor, cause the apparatus to further generate a prediction data object for the input unstructured textual data object based at least in part on providing the label-based feature data object to a first prediction machine learning model and perform one or more automated prediction-based actions.

BRIEF DESCRIPTION OF THE DRAWINGS

Having thus described the invention in general terms, reference will now be made to the accompanying drawings, which are not necessarily drawn to scale.

Figure 1:
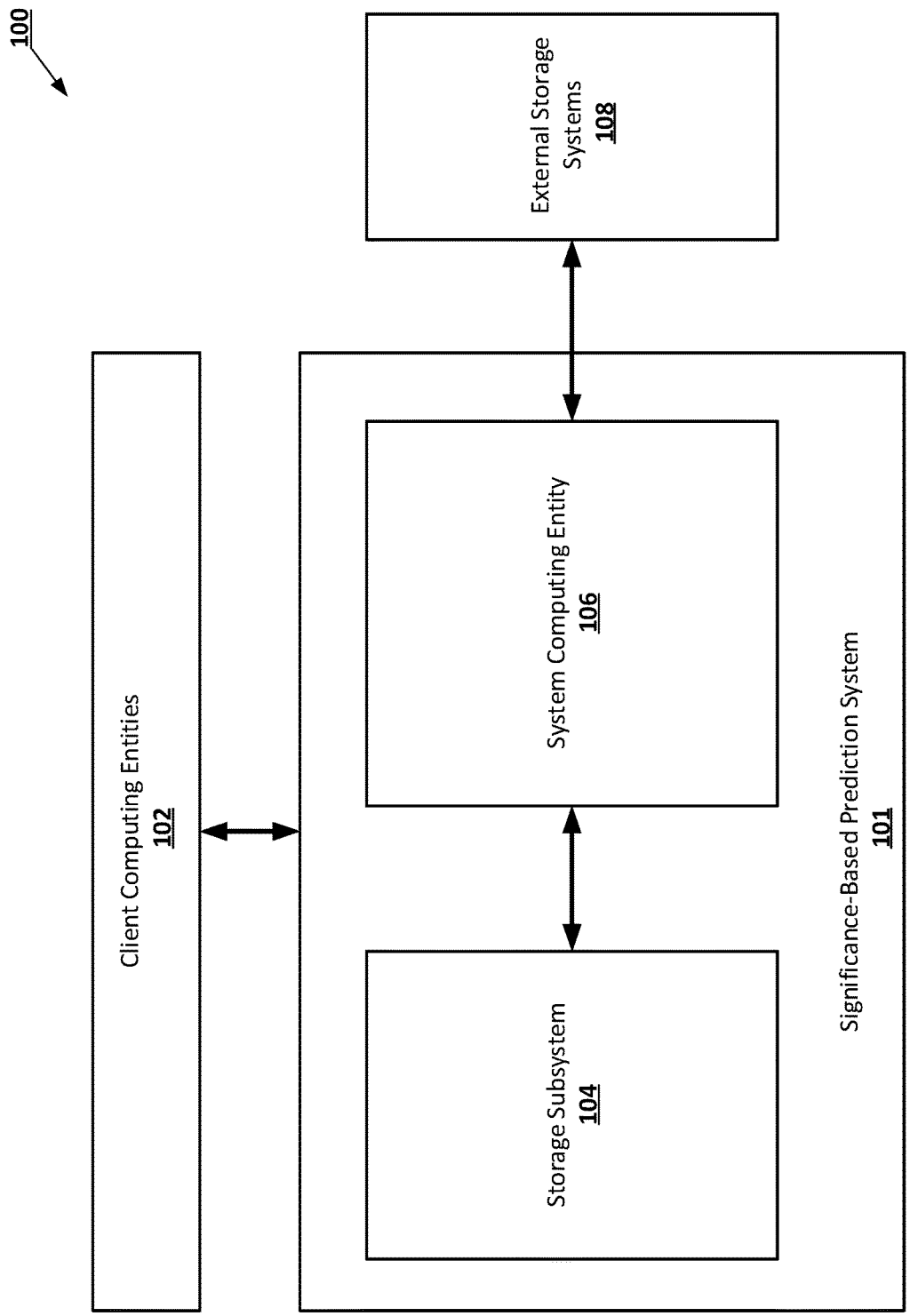

FIG. 1 provides an exemplary overview of a system that may be used to practice embodiments of the present disclosure.

Figure 2:
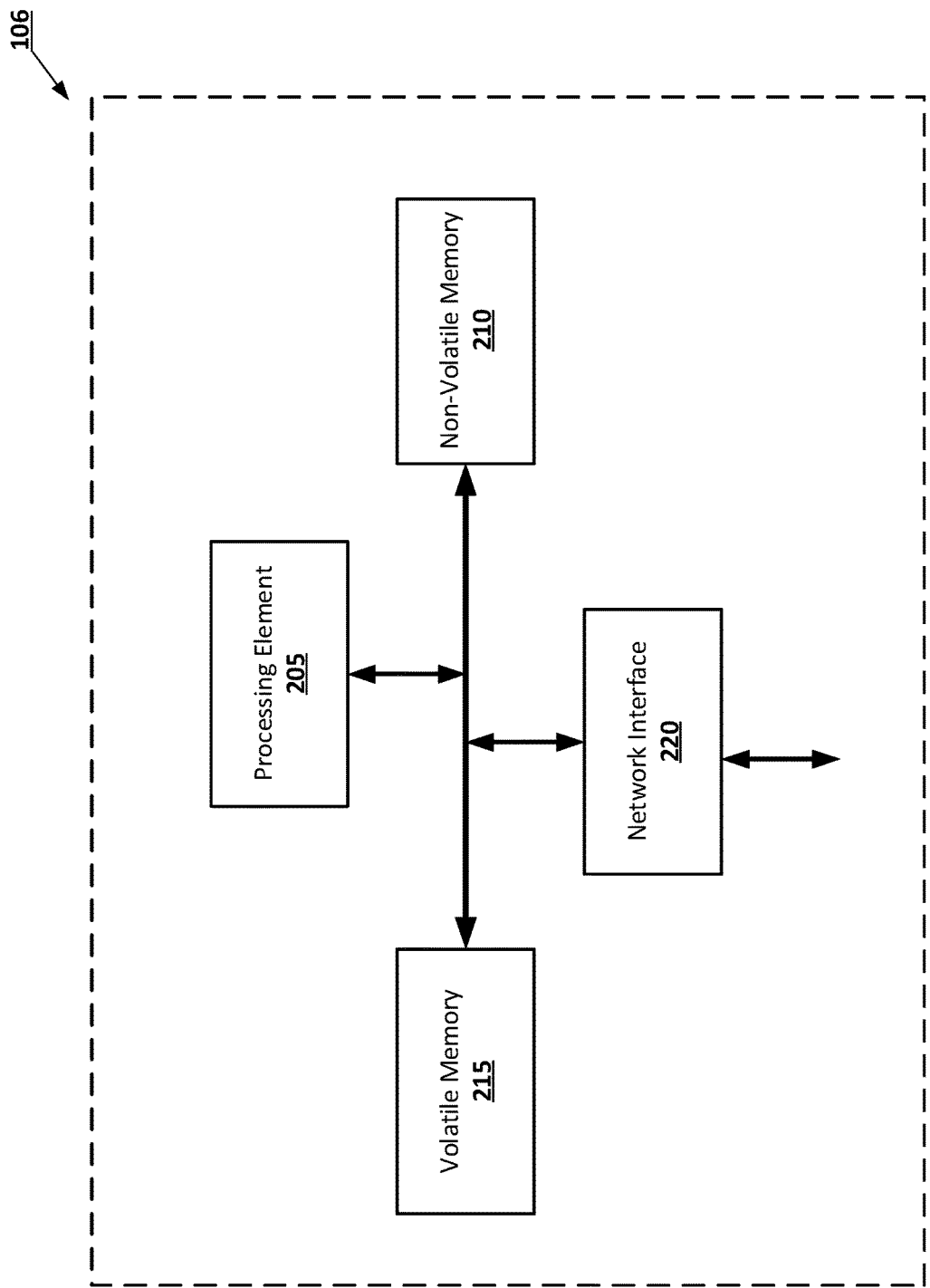

FIG. 2 provides a diagram of an example system computing entity, in accordance with some embodiments discussed herein.

Figure 3:
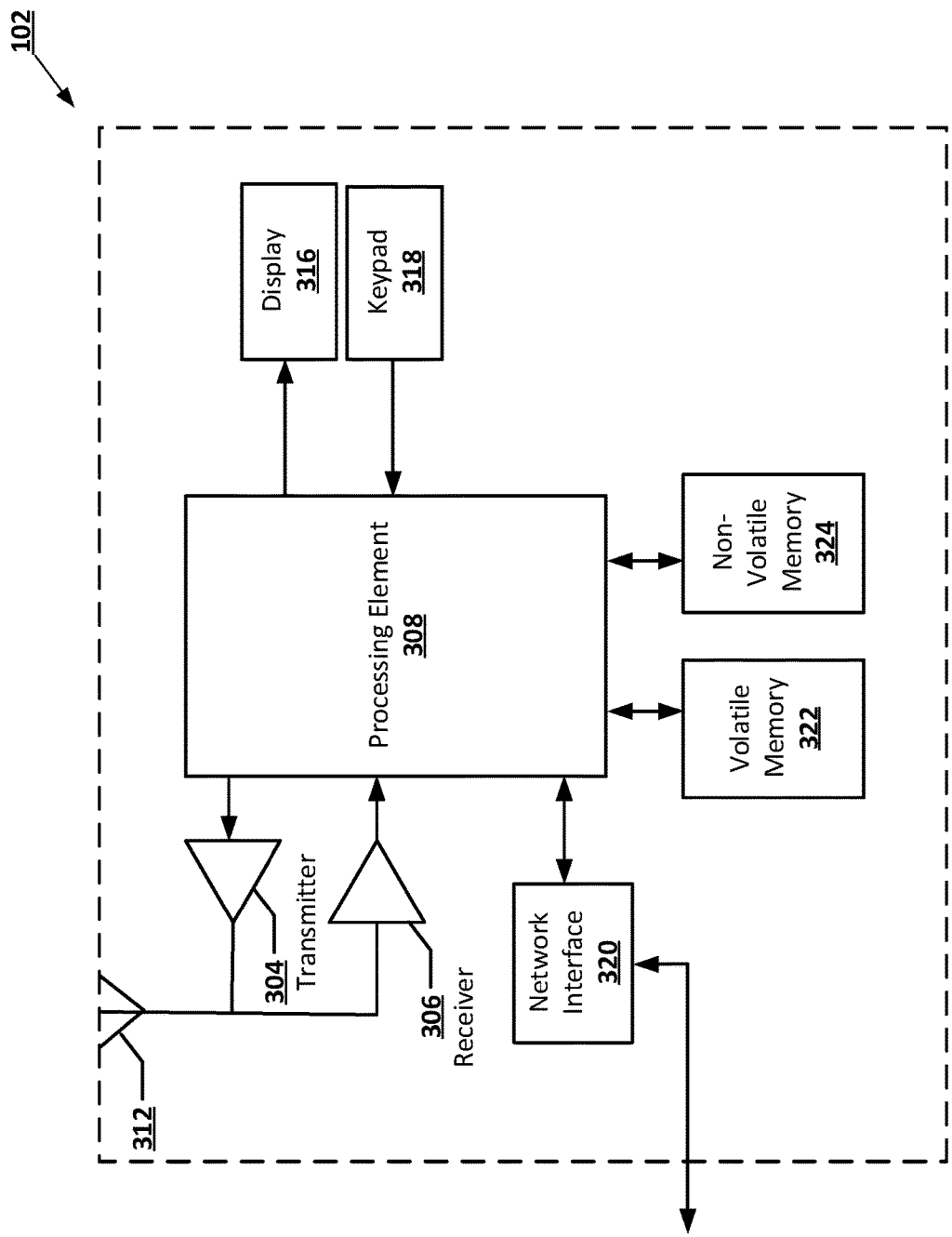

FIG. 3 provides a diagram of an example client computing entity, in accordance with some embodiments discussed herein.

Figure 4:
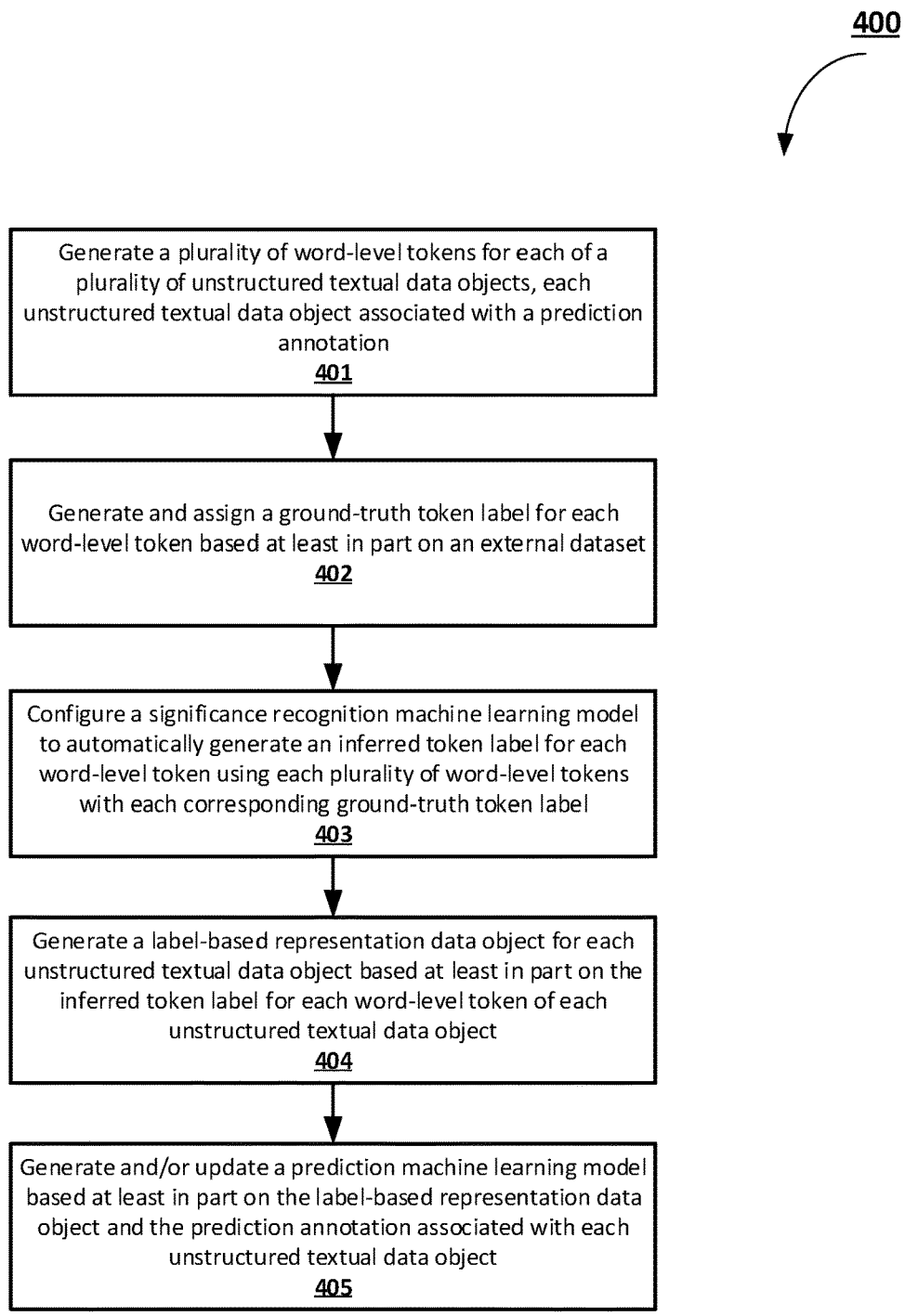

FIG. 4 provides a flowchart diagram of an example process for initializing a system for generating a significance-based prediction, in accordance with some embodiments discussed herein.

Figure 5:
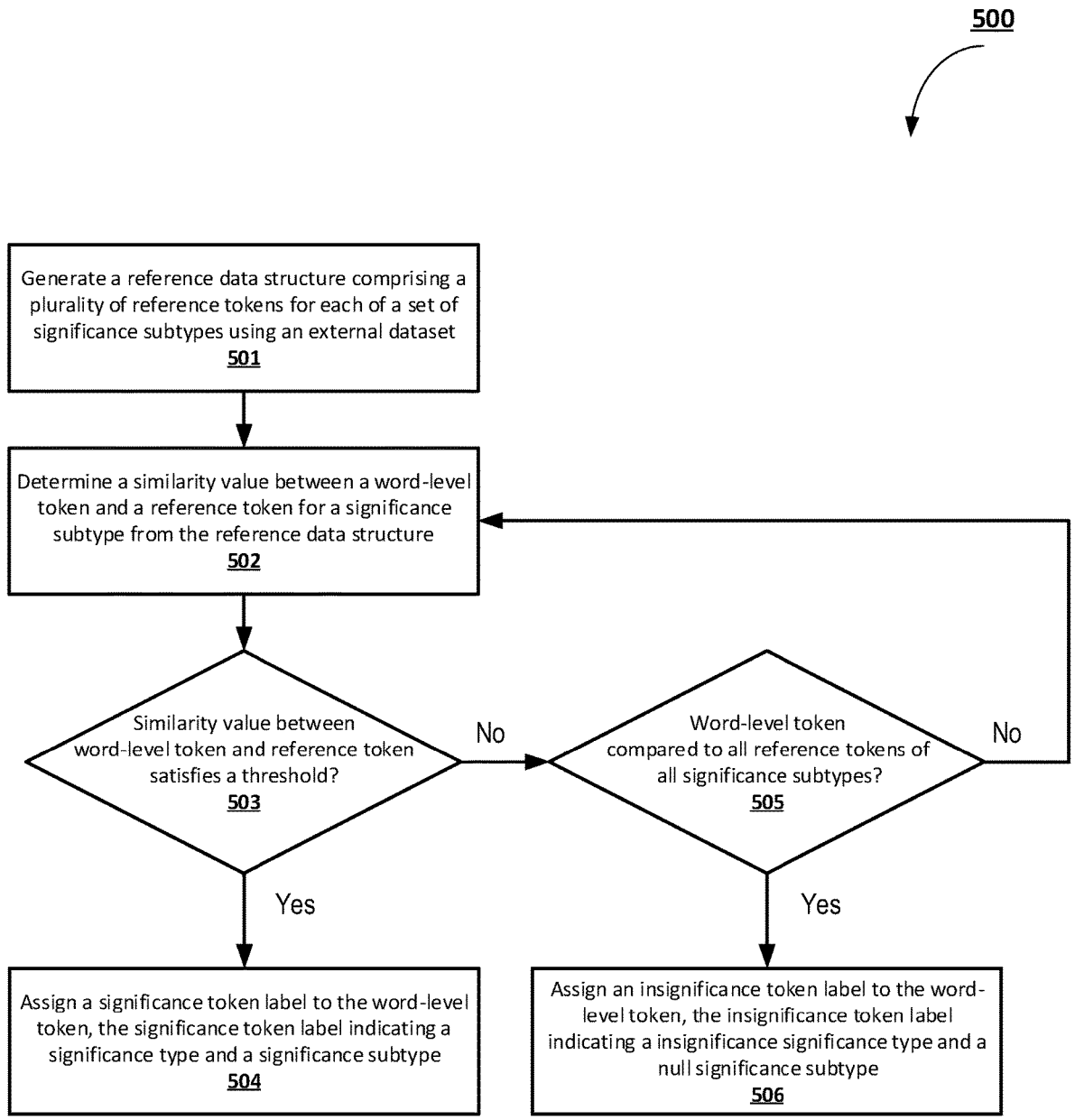

FIG. 5 provides a flowchart diagram of an example process for initializing a significance recognition machine learning model, in accordance with some embodiments discussed herein.

FIG. 6 illustrates example word-level tokens associated with example significance token labels, in accordance with some embodiments discussed herein.

Figure 7:
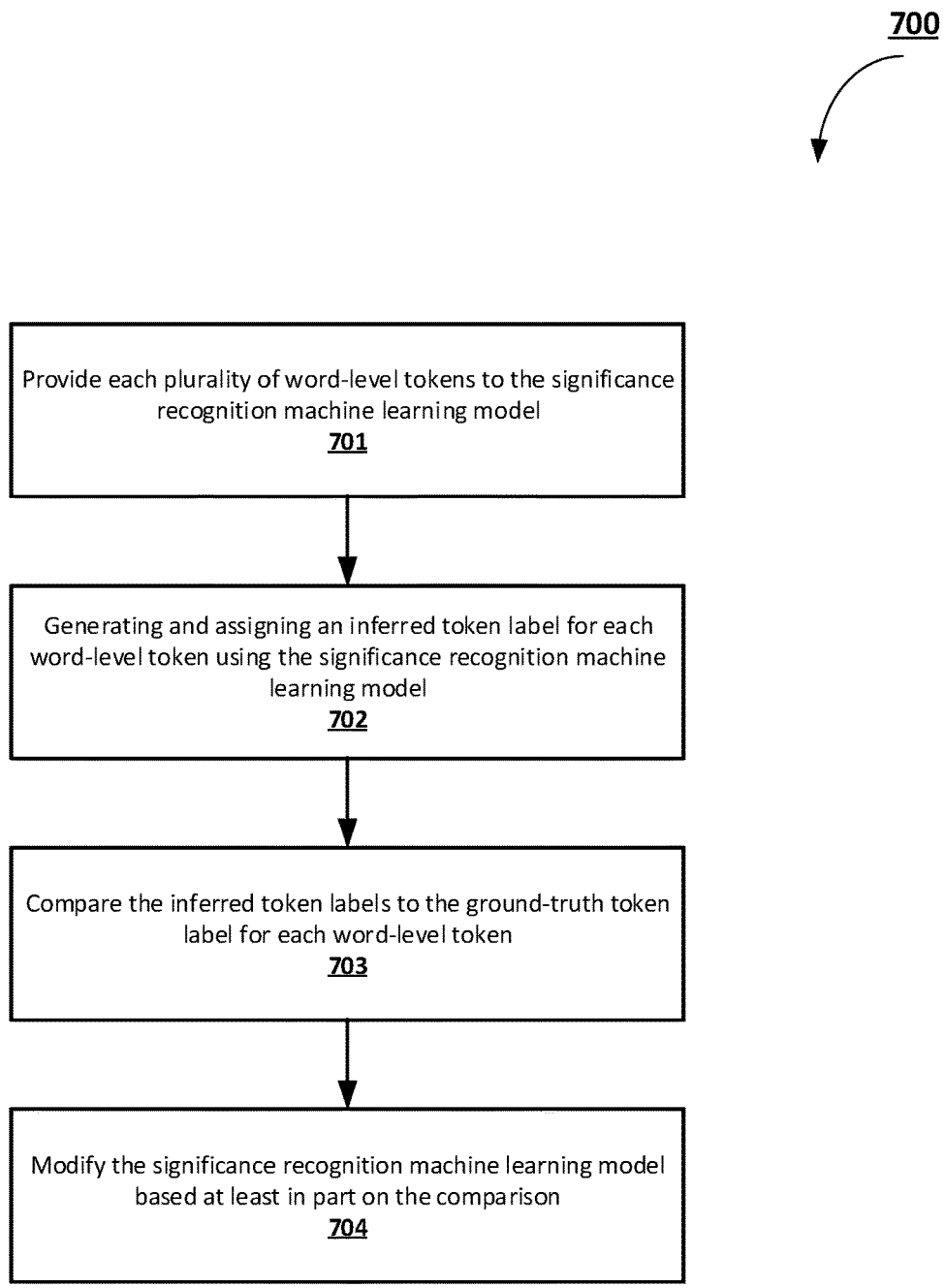

FIG. 7 provides a flowchart diagram of another example process for initializing a prediction machine learning model, in accordance with some embodiments discussed herein.

Figure 8:
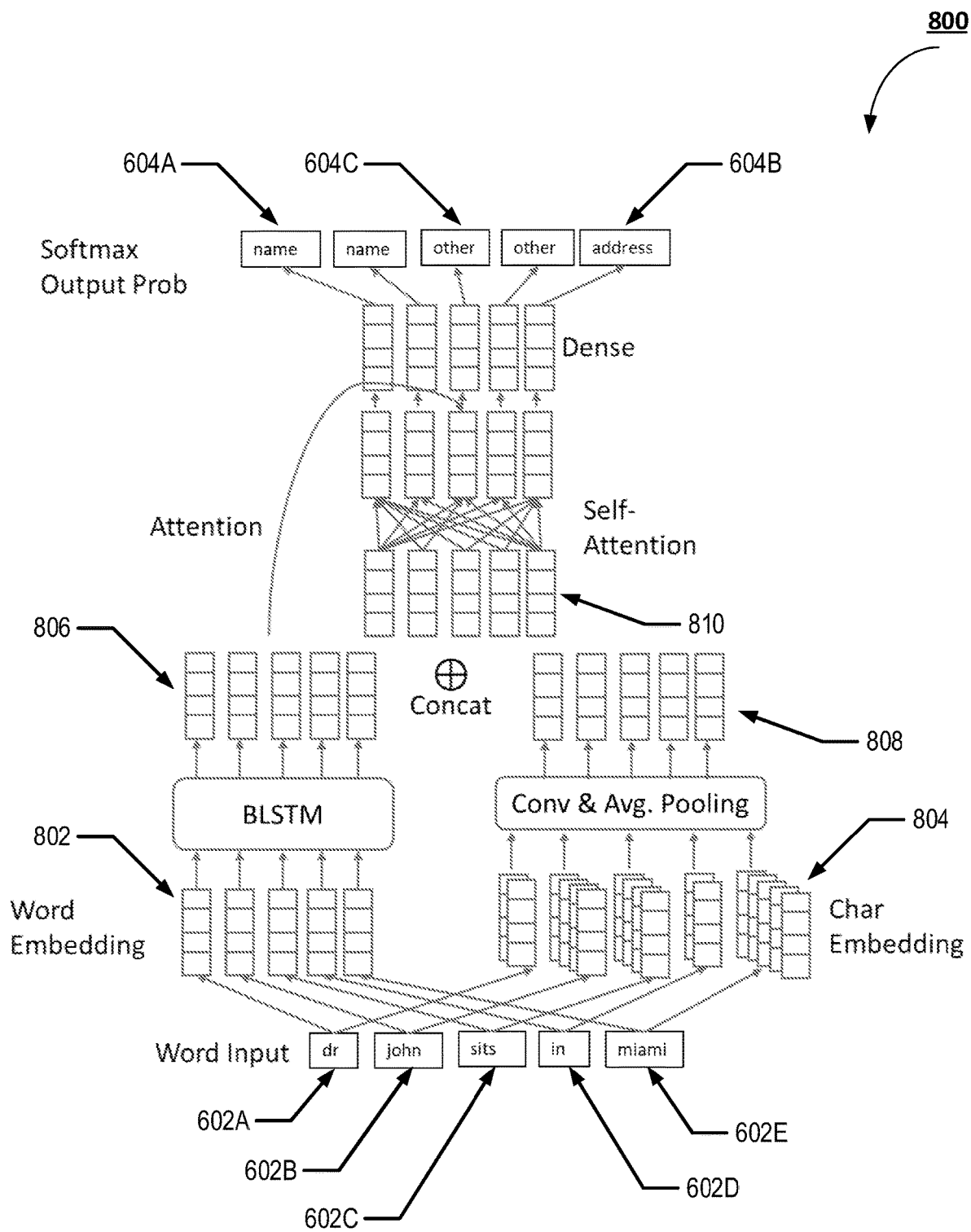

FIG. 8 provides a diagram of an example significance recognition machine learning model, in accordance with some embodiments discussed herein.

Figure 9:
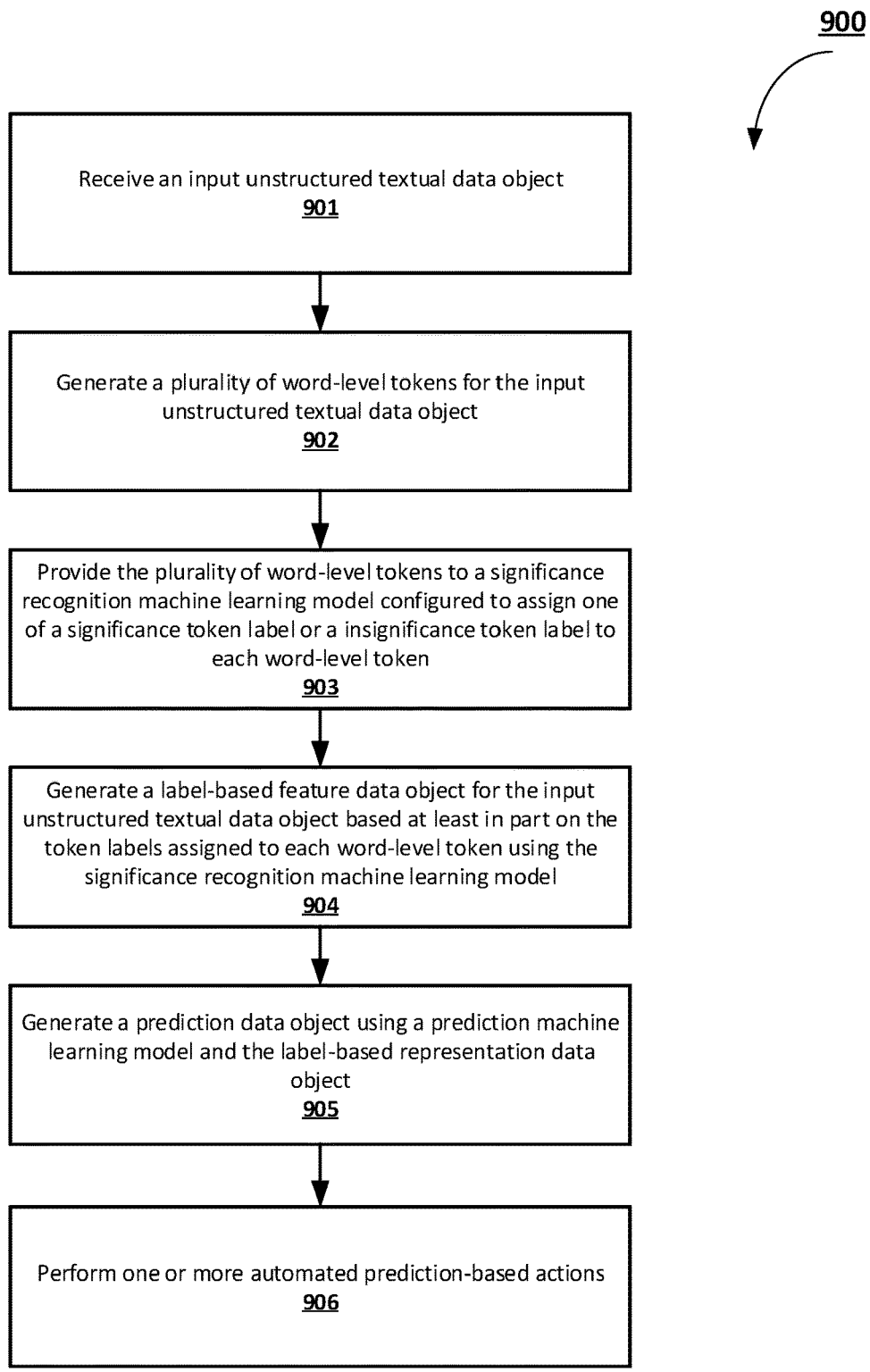

FIG. 9 provides a flowchart diagram of an example process for generating a significance-based prediction, in accordance with some embodiments discussed herein.

DETAILED DESCRIPTION

Various embodiments of the present disclosure now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to providing text-based summarizations of conversations, one of ordinary skill in the art will recognize that the disclosed concepts can be used in other summarization and/or text extraction applications.

I. OVERVIEW AND TECHNICAL IMPROVEMENTS

Various embodiments of the present disclosure address technical challenges related to generating a prediction based at least in part on significant information in unstructured text. Various embodiments of the present disclosure may be configured to, for example, predict an identifier of a healthcare provider rendering services in a medical encounter described by an unstructured textual data object based at least in part on demographic word-level tokens (the significant information) within the unstructured textual data object. In such applications, the identifier of the healthcare provider may be a National Provider Identifier (NPI) or some federated, global, or unique identifier (e.g., GUID, UIUD, hash). Further, such identifiers for a large population of healthcare providers may be stored in external datasets of large magnitude. Various embodiments may be configured to identify such significant information (e.g., demographic word-level tokens) within unstructured textual data objects and further use the identified significant information to generate a prediction. The identification of significant information may be accomplished using a significance recognition machine learning model that may be trained using reference data structures generated using one or more external datasets, and generation of a prediction data object using significant information identified or extracted from an unstructured textual data object may be accomplished using a prediction machine learning model. Accordingly, various embodiments enable the improved and intelligent prediction and labelling of an identifier for a healthcare provider without parsing or processing large magnitudes of data in external datasets to locate a single identifier.

Accordingly, various embodiments of the present disclosure provide technical advantages by accurately and precisely recognizing significant information within an unstructured textual data object. In the exemplary application for example, demographic information specific to a healthcare provider rendering healthcare services is recognized in order to generate a prediction of an identifier for said healthcare provider. Existing methods and systems relating to extracting information from unstructured text are not capable of information recognition of such high precision and may also identify demographic information of a patient, another healthcare provider, and other parties involved and described in an unstructured textual data object (e.g., false positives). Thus, it may be understood that various embodiments are uniquely configured to reduce the number of false positives (e.g., insignificant information incorrectly identified as significant) when labelling significant word-level tokens. Even further, various embodiments are also uniquely configured to reduce the number of false negatives when labelling significant word-level tokens. Due to possible signal noise and errors that may exist in the unstructured textual data object, various embodiments use similarity values and thresholds to also label significant information that may be misspelled, mistranslated, or otherwise imperfect. By reducing these false negative occurrences as well as false positive occurrences, various embodiments uniquely and advantageously recognize, identify, label, extract, and/or the like accurate and precise significant information for use in generating a prediction.

Various embodiments provide further technical advantages by providing an expandable and flexible framework for prediction based at least in part on one or more external datasets. In various embodiments, a prediction machine learning models may use one or more graph-based mechanisms for generating a prediction data object, each graph-based mechanism trained using an external dataset of a different size. Accordingly, the one or more graph-based mechanisms may vary in scope and size. Various embodiments then provide expandability and flexibility in instances where if a prediction data object cannot be generated using a first graph-based mechanism of the prediction machine learning model, a second graph-based mechanism of the prediction machine learning model with greater scope may be used to generate the prediction data object. Thus, efficiency may be improved by first using a prediction machine learning model with a scope trained using a smaller external dataset, and only using prediction machine learning models with larger scope trained using larger external datasets when necessary.

An exemplary application then of various embodiments of the present disclosure relates to generating a plurality of word-level tokens for an input unstructured textual data object; for each word-level token: determining, based at least in part on a word-level representation data object and a character-level representation data object and by using a significance recognition machine learning model, a significance type for the word-level token and a significance subtype for the word-level token, wherein the significance recognition machine learning model is configured to, for each word-level token: (i) determine a word-level representation data object for the word-level token, (ii) determine a character-level representation data object for the word-level token, and (iii) determine the significance type for the word-level token and the significance subtype for the word-level token based at least in part on the word-level representation data object for the word-level token and the character-level representation data object for the word-level token, and assigning one of a significance token label or an insignificance token label to the word-level token based at least in part on at least one of the significance type for the word-level token and the significance subtype for the word-level token; generating a label-based feature data object for the input unstructured textual data object based at least in part on a subset of word-level tokens from the plurality of word-level tokens, each word-level token of the subset being associated with the significance token label; generating a prediction data object for the input unstructured textual data object based at least in part on providing the label-based feature data object to a first prediction machine learning model; and performing one or more automated prediction-based actions.

II. EXEMPLARY DEFINITIONS

The term "unstructured textual data object" may refer to a data entity including text. The text of the unstructured textual data object may be unstructured such that the text is not organized in a pre-defined manner or is not assigned meaning by a pre-defined model. The text may be represented by characters, and an unstructured textual data object may be a data structure, graph, tensor, embeddings, dataset, and/or the like storing such characters. Each unstructured textual data object may correspond to be associated with, adapted from, based at least in part on, generated from, and/or the like an object including text. For example, an unstructured textual data object may correspond to a health record of a patient, or a health record describing one encounter, or a book. Thus, it may be inferred that text within the unstructured textual data object may be interrelated in some way and is aggregated as a unit. Various embodiments of the present disclosure relate to and generally involve prediction of some characteristic, aspect, classification, and/or the like for an unstructured textual data object. In the exemplary application for example, an unstructured textual data object may be an electronic health record of a medical encounter, and an identifier of the healthcare provider of the medical encounter is predicted and assigned to the unstructured textual data object.

The term "word-level token" may refer to a data entity configured to describe an individual word, lexical unit, exclamation, syllable, and/or the like, of text. Text (e.g., text of an unstructured textual data object) may be composed of a plurality of character-level token, and more specifically, text may be a sequence of character-level tokens. A word-level token may be composed of one or more character-level tokens, and a text may comprise one or more word-level tokens. A word-level token may be separated from other word-level tokens and generated based at least in part on various delimiters (e.g., spaces, tabs, periods, commas, line breaks). A word-level token may specifically be a string, array, data structure, embeddings, and/or the like described an individual word. In various embodiments, a word-level token may describe an individual word that may be relevant or significant to a prediction task or an individual word with inherent significant meaning, and such significance may be based at least in part on neighboring word-level tokens and/or other word-level tokens within the text. However, some word-level tokens may describe insignificant words.

The term "significance token label" may refer to a data entity configured to describe the significance type of a word described by a word-level token and/or the significance sub-type of the word described by the word-level token. A significance token label may be assigned to, may reference, may be linked with, may correspond to, and/or the like a word-level token describing a significant word or a word deemed relevant to a prediction or classification task. A significance token label may describe or indicate a specific significance subtype of a word described by a word-level token. In some instances, a word-level token may be assigned with an insignificance token label, which may describe the insignificance of a word described by the word-level token. An insignificance token label may be a data entity similar to a significance token label with the exception of the designation of the insignificance as opposed to significance.

The term "significance type" may describe a particular meaning or classification of a word deemed to be significant. That is, a significance type may be a class of information deemed to be relevant in generating a prediction. In the exemplary application for example, demographic information may be deemed to be significance type. In some instances, multiple significance types may be of interest; for example, a first significance type of demographic information and a second significance of medical codes may both be identified. Each significance type may be further classified with significance subtypes. For example, name, address, and telephone number may each be considered to be a significance subtype for the significance type of demographic information. A significance type and a significance subtype may be indicated by a significance token label. For example, a significance token label assigned to a particular word-level token may indicate that the particular word-level token is demographic information and that the particular word-level token is specifically describing a name of a healthcare provider. In contrast, an insignificance significance type (also referred herein as an insignificance type) is not further classified with subtypes and may be associated with a null significance subtype. Specifically, insignificance may be denoted by a null significance type, an "other" significance type, and/or an insignificance type.

The term "significance recognition machine learning model" may refer to a data entity configured to recognize, identify, label, extract, and/or the like significant word-level tokens in an unstructured textual data object. A significance recognition machine learning model is configured to identify a significance type and a significance subtype of a word-level token. Further, a significance recognition machine learning model may be configured to assign significance token labels to various word-level tokens in an unstructured textual data object. A significance recognition machine learning model may be trained using external datasets to identify word-level tokens corresponding to significant words and accordingly assign significant word-level tokens to such word-level tokens. In some embodiments, the significance recognition machine learning model may be and/or may comprise a neural network (e.g., a convolutional neural network (CNN), a recurrent neural network (RNN)), one or more machine learning models configured to perform various natural language processing (NLP) tasks, supervised machine learning models, semi-supervised machine learning models, and/or the like. In some embodiments, the inputs to the significance recognition machine learning model include vectors representing word-level tokens. In some embodiments, outputs of the significance recognition machine learning model include vectors each representing a significance type and a significance subtype of a word-level token and/or a significance type distribution and a significance subtype distribution of a word-level token.

The term "reference data structure" may refer to a data entity used to train a significance recognition machine learning model. A reference data structure may store reference tokens corresponding to words deemed to be significant and may associate various reference tokens with significance subtypes. A given word-level token may then be compared to reference tokens stored in a reference data structure, and a significance type and a significance subtype may be determined for the given word-level token. The determined significance type and significance subtype may then be used to train a significance recognition machine learning model to generally assign significance token labels to word-level tokens. A reference data structure may be generated or constructed using one or more external datasets.

The term "external dataset" may refer to a data entity configured to describe at least a plurality of significant information relevant for a prediction task (e.g., generating the prediction data object). An external dataset may store data such as the significant information in a structured format based at least in part on significance type, significance subtype, a corresponding entity or object, and/or the like. In the exemplary application for example, an external dataset may store demographic information, including name, address, telephone number, for each of a plurality of healthcare providers. Furthermore, an external dataset may describe (e.g., store) data that may be used in generating a prediction data object and/or may be included in the prediction data object. Referring again to the exemplary application, an external dataset may store a corresponding identifier for each healthcare provider, and thus, an external dataset may store both demographic information (the significant information) and an identifier (the predicted information) for each of a plurality of healthcare providers. An external dataset may be any data structure, tree, graph, tensor, array, matrix, embeddings, dataset, and/or the like.

The term "label-based feature data object" may refer to a data entity configured to describe significant information of an unstructured textual data object and/or characterize and represent an unstructured textual data object. A label-based feature data object may be based at least in part on word-level tokens of the unstructured textual data object assigned with significance token labels. For example, a label-based feature data object may be a data object comprising a plurality of word-level tokens assigned with significance token labels, or significant word-level tokens. A label-based feature data object may be a data structure, graph, tensor, embeddings, dataset, and/or the like configured to describe the significant word-level tokens of an unstructured textual data object.

The term "prediction machine learning model" may refer to a data entity configured to generate a prediction data object based at least in part on a label-based feature data object and/or labelled word-level tokens of an unstructured textual data object. For example, a prediction machine learning model may receive a label-based feature data object as input and output a prediction data object. A prediction machine learning model may be accordingly trained in a supervised manner to generate prediction data objects using label-based feature data objects. A prediction machine learning model may be and/or may comprise one or more graph-based mechanisms (e.g., a k-nearest graph), a logarithmic regression model, a neural network (e.g., an artificial neural network (ANN)), supervised machine learning models, semi-supervised machine learning models, and/or the like configured to generate a prediction data object using a label-based feature data object. In some embodiments, the inputs to the prediction machine learning model include vectors representing label-based feature data objects. In some embodiments, outputs of the prediction machine learning model include vectors each representing a prediction associated with an unstructured textual data object, such as a predicted identifier for a healthcare provider rendering services in a medical encounter described by an unstructured textual data object.

III. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example system architecture 100 for generating a significance-based prediction. For example, the system architecture may be used to recognize, identify, extract, and/or the like demographic information (deemed to be significant) from an unstructured textual data object and predict an identifier of a healthcare provider rendering services in a medical encounter described by the unstructured textual data object using the demographic information. The system architecture 100 includes a significance-based prediction system 101 configured to receive unstructured textual data objects as input from client computing entities 102, recognizing significant word-level tokens within unstructured textual data objects in part by using external storage systems 108, generate prediction data objects based at least in part on the significant word-level tokens, and provide such prediction data objects to the client computing entities 102. In various embodiments, the significance-based prediction system 101 may be configured to train and use a significance recognition machine learning model to recognize, identify, label, extract, and/or the like significant word-level tokens in unstructured textual data objects and may be further configured to train and use a prediction machine learning model to generate predictions using the significant word-level tokens.

In some embodiments, the significance-based prediction system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). In various embodiments, the significance-based prediction system 101 comprises an application programming interface (API), receives an unstructured textual data object from a client computing entity 102 as an API call, and provides a prediction data object as an API response.

The significance-based prediction system 101 may include a system computing entity 106 and a storage subsystem 104. The system computing entity 106 may be configured to receive unstructured textual data objects from one or more client computing entities 102, label significant word-level tokens in unstructured textual data objects, generate prediction data objects based at least in part on the significant word-level tokens, and provide the prediction data objects to the client computing entities 102. In various embodiments, the system computing entity 106 is a cloud-based computing system and comprises one or more computing devices each configured to share and allocate computer processing resources and data The storage subsystem 104 may be configured to store unstructured textual data objects received by the system computing entity 106, significance recognition machine learning models for identifying significant word-level tokens, reference data structures for training significance recognition machine learning models, prediction machine learning models for generating prediction data objects based at least in part on significant word-level tokens, prediction data objects, and/or the like. The storage subsystem 104 may be configured to store other data or information used by the system computing entity 106 to generate significance-based predictions. The storage subsystem 104 may include one or more storage units, such as multiple distributed storage units that are connected through a computer network. Each storage unit in the storage subsystem 104 may store at least one of one or more data assets and/or one or more data about the computed properties of one or more data assets. Moreover, each storage unit in the storage subsystem 104 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Computing Entities

In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

FIG. 2 provides a schematic of a system computing entity 106, according to one embodiment of the present disclosure. As shown in FIG. 2, in one embodiment, the system computing entity 106 may include, or be in communication with, one or more processing elements 205 (also referred to as processors, processing circuitry, and/or similar terms used herein interchangeably) that communicate with other elements within the system computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the system computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the system computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the system computing entity 106 with the assistance of the processing element 205 and operating system.

As indicated, in one embodiment, the system computing entity 106 may also include one or more network interfaces 220 for communicating with various computing entities (e.g., one or more other system computing entities 106, one or more client computing entities 102), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the system computing entity 106 may include, or be in communication with, one or more input elements, such as a keyboard input, a mouse input, a touch screen/display input, motion input, movement input, audio input, pointing device input, joystick input, keypad input, and/or the like. The system computing entity 106 may also include, or be in communication with, one or more output elements (not shown), such as audio output, video output, screen/display output, motion output, movement output, and/or the like.

FIG. 3 provides a schematic of an example client computing entity 102 that may be used in conjunction with embodiments of the present disclosure. Client computing entities 102 can be operated by various parties, and the system architecture 100 may include one or more client computing entities 102. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the system computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the system computing entity 106 via a network interface 320.

Via these communication standards and protocols, the client computing entity 102 can communicate with various other entities (e.g., system computing entities 106, storage subsystem 104) using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the system computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the system computing entity 106, various other computing entities, and/or a storage subsystem 104.

In another embodiment, the client computing entity 102 may include one or more components or functionality that are the same or similar to those of the system computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present disclosure address technical challenges related to generating a significance-based prediction from an unstructured textual data object. Various embodiments recognize, identify, label, extract, and/or the like significant information of an unstructured textual data object in an accurate and precise manner. For example, various embodiments are configured to accurately and precisely label demographic information of a healthcare provider rendering healthcare services in a medical encounter described by an unstructured textual data object. Significant information is then used to generate a prediction data object. Various embodiments may include a significance recognition machine learning model used to label significant word-level tokens of an unstructured textual data object and a prediction machine learning model used to generate prediction data objects based at least in part on the labelled significance word-level tokens.

Exemplary Initialization Operations

FIG. 4 provides a flowchart diagram of an example process 400 for initializing the significance-based prediction system 101 for generation of prediction data objects, or otherwise initialize the generation of prediction data objects. In various embodiments, system computing entity 106 comprises means, such as processing element 205, memories 210, 215, network interface 220, and/or the like, for performing various operations for initializing the significance-based prediction system 101 for generation of prediction data objects, such as the operations described in the context of process 400. In general, process 400 may be performed for an individual external dataset and can be performed for each of one or more external datasets. In the exemplary application, different external datasets may store identifiers for different populations of healthcare providers of different sizes. Accordingly, process 400 may be performed using a first external dataset to initialize the significance-based prediction system 101 to predict identifiers for a first population of healthcare providers, and may be performed again using a second external dataset to initialize the significance-based prediction system 101 to predict identifiers for a second population of healthcare providers. Specifically, a prediction machine learning model may be generated for each of the one or more external datasets, and the significance-based prediction system 101 may be initialized to select and use a particular prediction machine learning model to generate a prediction data object for an input unstructured textual data object.

Process 400 comprises step/operation 401, which involves generating a plurality of word-level tokens for each of a plurality of unstructured textual data objects. In various embodiments, the plurality of unstructured textual data objects may be received by the system computing entity 106 and originating from one or more client computing entities 102. In various other embodiments, the system computing entity 106 may be configured to retrieve the plurality of unstructured textual data objects from the storage subsystem 104 to initialize the significance-based prediction system 101 to generate prediction data objects. In further embodiments, the plurality of unstructured textual data objects may be stored and retrieved from one or more external storage systems 108.

Each of the unstructured textual data objects may be associated with a prediction annotation related to the prediction task and/or the prediction data objects. In the exemplary application for example, identifiers for a healthcare provider rendering healthcare services are predicted using the significance-based prediction system 101, and as such, each of the plurality of unstructured textual data objects may be associated with an identifier annotation to initialize or train the significance-based prediction system 101. Thus, the plurality of unstructured textual data objects each associated with a prediction annotation may be understood as a plurality of historical unstructured textual data objects. In some embodiments, the prediction annotation associated with one or more of the plurality of unstructured textual data objects may be a prediction data object previously or historically generated by the significance-based prediction system 101. For example, a prediction annotation for a particular unstructured textual data object may be a prediction data object describing a predicted identifier previously generated by the significance-based prediction system 101. Thus, in various embodiments, the prediction annotation corresponds to and may be similar to a prediction data object.

In various embodiments, each of the plurality of unstructured textual data objects comprise unstructured or free text. The text of each unstructured textual data object may have been generated using various techniques or systems. In one embodiment, the text of an unstructured textual data object may have been and/or may be generated via an optical character recognition (OCR) system. Specifically, an optical character recognition (OCR) system may be configured to generate textual data from an image. Thus, in some embodiments, an unstructured textual data object may be and/or may comprise image or visual data, and an OCR system may be used to first generate text for the unstructured textual data object. In one embodiment, the text of an unstructured textual data object may have been and/or may be generated via an audio transcription system. For example, an unstructured textual data object may be and/or may comprise auditory data (e.g., a recording of spoken words), and an audio transcription system may be used to first generate text for the unstructured textual data object. In yet another embodiment, the text of an unstructured textual data object may have been and/or may be electronically entered or generated by user or operator via a user interface (e.g., a keyboard) of a system computing entity 106 and/or a client computing entity 102. It may be appreciated then that text of an unstructured textual data object may comprise various noise and errors (e.g., incorrect character or text classification when using an OCR system, incorrect transcription due to audio signal noise when using an audio transcription system, incorrect text due to human error).

In the exemplary application, each unstructured textual data object comprises text from a clinical chart describing one or more medical encounters. Each unstructured textual data object may comprise portions or sections of text; for example, a clinical chart may be composed of multiple pages, and text within a corresponding unstructured textual data object is sectioned or divided by page. In some instances for the exemplary application, a clinical chart may be a comprehensive record for a patient and may describe multiple medical encounters, each medical encounter identified by a barcode or a unique identifier. Thus, in various embodiments, an unstructured textual data object comprises text from one or more pages identified by the same barcode or unique identifier, and more than one unstructured textual data object may then correspond to a clinical chart, in the exemplary application. In various embodiments, each unstructured textual data object is generated by providing an image of a corresponding clinical chart (or select pages thereof corresponding to a barcode or a unique identifier) to an OCR system configured to generate textual data from text present in the clinical chart.

In various embodiments, generation of word-level tokens for each unstructured textual data object may begin with pre-processing each unstructured textual data object. That is, step/operation 401 comprises pre-processing each unstructured textual data object, in various embodiments. In some embodiments, pre-processing each unstructured textual data object may comprise converting all the text within an unstructured textual data object to lower case. In some embodiments, pre-processing may further comprise removing special characters. For example, text generated by an audio transcription system may include special characters denoting audio signals not directly translatable to text (e.g., \laughter). In various instances, other special characters inherent in text, such as some punctuation marks, newline characters, breaks, whitespaces, and/or the like, are removed from the text for pre-processing.

Subsequent to pre-processing, a plurality of word-level tokens may be generated for each unstructured textual data object. Various tokenization techniques or methods may be used to generate the plurality of word-level tokens. In various embodiments, different tokenization techniques may be used based at least in part on delimiters (e.g., spaces, tabs, periods, commas, line breaks) separating words within the text of an unstructured textual data object. Thus, with the generation of word-level tokens, individual words within an unstructured textual data object may be separately and/or independently analyzed to initialize the significance-based prediction system 101. As an example, generation of word-level tokens for an unstructured textual data object comprising the (pre-processed) text "dr john sits in miami" results in five word-level tokens "dr", "john", "sits", "in", and "miami".

In various embodiments, each word-level token may be padded such that all word-level tokens are the same length, size, dimension, and/or the like. For example, each word-level token constituted of less than ten characters may be padded with zeros, null characters, and/or the like such that all word-level tokens are constituted of at least ten characters. Furthermore, each unstructured textual data object may be padded such that all unstructured textual data objects comprise the same number of word-level tokens. For example, unstructured textual data objects comprising less than two-hundred-and-fifty word-level tokens may be padded with empty word-level tokens (e.g., word-level tokens comprising null characters or zeros).

Process 400 comprises step/operation 402, which involves generating and assigning a ground-truth token label for each word-level token of each unstructured textual data object based at least in part on an external dataset. Specifically, the ground-truth token label assigned to each word-level token may be either a significance token label or an insignificance token label. A significance token label may indicate that the word-level token is relevant for the generation of a prediction data object, while an insignificance token label may indicate that the word-level token is irrelevant for the generation of a prediction data object. In the exemplary application for example, a significance token label may indicate that a corresponding word-level token describes demographic information of a rendering healthcare provider that may be used to predict an identifier for the rendering healthcare provider. In various embodiments, a ground-truth token label may indicate a significance type and a significance subtype for a word-level token. For example, a ground-truth token label may first indicate that a word-level token is of a demographic information significance type and an address significance subtype.

For the initialization of the significance-based prediction system 101 in process 400, ground-truth token labels may be generated for each word-level token by referencing one or more external datasets that contain data relevant to the prediction task (e.g., generating the prediction data object).

In the exemplary application for example, each external dataset may contain demographic information and identifiers for a plurality of healthcare providers. Each external dataset may contain demographic information and identifiers for a different plurality of healthcare providers. That is, in various embodiments, each external dataset may contain data relevant to the prediction task of a different scope compared to other external datasets.

Referring now to FIG. 5, an example process 500 for generating ground-truth token labels and assigning ground-truth token labels to word-level tokens is provided. That is, process 500 may be an example embodiment of step/operation 402. In various embodiments, system computing entity 106 comprises means, such as processing element 205, memories 210, 215, network interface 220, and/or the like, for performing various operations for generating and assigning ground-truth token labels to word-level tokens, such as the operations described in the context of process 500.

Process 500 comprises step/operation 501, which includes generating a reference data structure comprising a plurality of reference tokens for each of a plurality of significance subtypes using an external dataset. In some embodiments, one or more reference data structures may be generated, each corresponding to a different external dataset. In various embodiments, the reference data structure may be structured similar to a lookup table and may be primarily categorized based at least in part on significance subtype. The plurality of significance subtypes may be understood as sub-classifications of a significance type. In the exemplary application for example, demographic information (deemed to be significant in predicting identifiers of rendering healthcare providers) may be further classified into significance types of name, address, zip code, telephone number, and/or the like. Thus, a word determined to be of a particular significance type may be further classified with a significance subtype. In various embodiments, an insignificance significance type (also a null significance type or an "other" significance type) is not further classified with a subtype, or is further classified with a null significance subtype.

In various embodiments, the plurality of significance subtypes may be established or configured based at least in part on the one or more external datasets. The one or more external datasets may store data corresponding to certain significance subtypes, and as such, the reference data structure may be generated for the certain significance subtypes. In various other embodiments, the plurality of significance subtypes may be established or configured based at least in part on user input. For example, a user may decide and select certain significance subtypes that may be relevant in generating prediction data objects. In the exemplary application for example, a user may select the name significance subtype, the address significance subtype, and the telephone significance subtype, and the reference data structure may be generated based at least in part on the three selected significance subtypes. The significance subtypes may be further configured to enable accurate labelling of word-level tokens (e.g., reducing false negatives, or the number of insignificantly-labelled significant words). In the exemplary application for example, the plurality of significance subtypes may include a telephone significance subtype, a first telephone portion (e.g., an area code of a telephone number) significance subtype, and a second telephone portion (e.g., the remainder of a telephone number) significance subtype. Accordingly, with separate significance subtypes for portions of a telephone number, word-level tokens that may only describe a portion of a telephone number, which itself is a significance subtype, may also be labelled with some significance. In another example, the plurality of significance subtypes includes a zipcode subtype, a first zipcode portion significance subtype, and a second zipcode portion significance subtype. Thus, it may be appreciated that the configuration of the plurality of significance subtypes advantageously enables the accurate and precise labelling of word-level tokens, such accuracy and precision being reflected in the generation of prediction data objects.

A reference data structure may then comprise reference tokens for each of the plurality of significance subtypes, the reference tokens based at least in part on a corresponding external dataset. A reference token may describe a word included in the data corresponding to a significance subtype and stored by the corresponding external dataset. In the exemplary application for example, an external dataset may be a database of healthcare providers and may store the name, address, zip code, and telephone number for each healthcare provider. Accordingly, a reference data structure may store a plurality of reference tokens describing the names of healthcare providers as described by the external dataset, the plurality of reference tokens being associated with the name significance subtype. In various embodiments, the reference tokens may be tokenized at a word-level; for example, a reference data structure may comprise reference tokens "john", "smith", "bob", "williams" for a name significance subtype. As also described, the reference data structure may comprise multiple reference tokens for each significance subtype.

Process 500 comprises step/operation 502, which comprises determining a similarity value between a word-level token of an unstructured textual data object and a reference token for a significance subtype from the reference data structure. Various comparison techniques or methods may be used to determine a similarity value between the word-level token and a reference token. In some embodiments, a Word Mover's Distance technique is used to determine a semantically meaningful comparison and similarity value between the word-level token and the reference token. In some other embodiments, a cosine similarity value may be determined between the word-level token and the reference token, or between the vector representations of each thereof.

At step/operation 503, the determined similarity value is then compared to a similarity threshold. In various embodiments, the similarity threshold may be configurable (e.g., via user input). It will be appreciated that the similarity threshold may enable noisy, incorrect, mis-translated, and/or the like word-level tokens to be correctly labelled as significant. For example, a word-level token generated from an OCR system may have an incorrectly classified character; however, the similarity threshold enables correct labelling of the word-level token. Thus again, various embodiments of the present disclosure reduce a false negative rate of significance labelling, or the number of significant words incorrectly labelled as insignificant.

Accordingly, if the determined similarity value satisfies the similarity threshold, a significance token label may be assigned to the word-level token at step/operation 504. Thus, the ground-truth token label assigned to the word-level token is a significance token label. In various embodiments, the significance token label indicates a significance type and a significance subtype, or specifically the significance subtype of the reference token to which the word-level token is similar.

Otherwise, step/operation 505 may be performed. Step/operation 505 comprises determining whether the word-level token has been compared to all other reference tokens of all significance types and significance subtypes. In other words, the word-level token may be compared to each reference token of the reference data structure until a similarity value satisfies a threshold and a significance token label is assigned. If the word-level token has been compared to each and every reference token of the reference data structure without a significance token label being assigned, then step/operation 506 may be performed. Step/operation 506 comprises assigning an insignificance token label to the word-level token, indicating that the word-level token has not been found to describe any significant information for generating a prediction data object. Thus, the ground-truth token label assigned to the word-level token is an insignificance token label. In various embodiments, the insignificance token label indicates the insignificance significance type, the null significance type, the "other" significance type, and/or the like. The insignificance token label further indicates the null significance subtype. If the word-level token has not been compared to each reference token of the reference data structure, at least step/operation 502 may be performed again with another reference token.

Thus, a word-level token may iterate through the reference tokens of a reference data structure to be assigned either a significance token label or an insignificance token label. In various embodiments, at least steps/operations 502, 503, 504, 505, and 506 may be performed for each word-level token of each unstructured textual data object, such that each word-level token of each unstructured textual data object is assigned with a ground-truth token label (a significance token label or an insignificance token label). It may be appreciated that because the external dataset comprises specific significant information, the significance-based prediction system 101 may be configured and initialized with high specificity, accuracy, and prediction. For example, use of an external dataset only comprising demographic information for healthcare providers reduces the chance of demographic information for patients being incorrectly identified as being significant. Thus, the use of external datasets with specific information provides technical advantages over existing methods and systems. In various embodiments, example operations for generating and assigning ground-truth token labels are provided in the following Algorithm 1.

Algorithm 1
Algorithm 1: Data Labelling for Entity Extraction

Data: Corpus of raw text, Lookup data (Claims or,
NPPES, EntityList = {name, address, zip,
zip1, zip2, tel, tel1, tel2};
Hyperparameter: similarity threshold $\epsilon$ ;
Initialize: $text_{id}$ = 0;
for all text in Corpus do
    $text_{id}$ = $text_{id}$ + 1
    get $primary_{key}$,
    $word_{id}$ = 0
    for all words $w_t \in \{word_1, word_2, \ldots, word_{dtext}\}$ do
        $word_{id}$ = $word_{id}$ + 1;
        for entity $e_t \in$ EntityList do
            $entity_{words}$ = lookupdata[$primary_{key}$][$e_t$];
            for $entity_{word}$ E $entity_{words}$ do
                if similarity($w_t$, $entity_{word}$) > $\epsilon$ then
                    yield $text_{id}$, $word_{id}$, $w_t$, $e_t$,
                else
                    yield $text_{id}$, $word_{id}$, $w_t$, other;
                end
            end
        end
    end
end In various embodiments, the word-level tokens may be further processed subsequent to being assigned with either a significance token label or an insignificance token label. For example, word-level tokens assigned with an insignificance token label with an unfavorable length, size, or dimension may be removed to avoid complications with later processing and model configuration. As another example, similar words, such as abbreviations (e.g., "dr" and "doctor") may be modified to be the same to eliminate ambiguity (e.g., "doctor" to "dr").

FIG. 6 illustrates an example result of step/operation 402 (e.g., embodied by process 500) of generating a token label for each word-level token. Specifically, FIG. 6 illustrates word-level tokens being assigned token labels according to the exemplary application, wherein name, address, zip code, and telephone number are significance subtypes of demographic information. FIG. 6 illustrates two tables listing a plurality of word-level tokens 602. Each word-level token 602 is assigned or associated with a significance subtype 604 (e.g., via significance token labels). For example, each of "3060", "alton", "road" are assigned with a significance token label indicating an address significance subtype. Meanwhile, the word-level tokens 602 of "jonas", "ivan", "m", and "md" are each assigned with a significance token label indicating a name significance subtype. As further shown, various word-level tokens 602 may be assigned with an insignificance token labels indicating an "other" or null significance subtype. For example, the word-level tokens 602 of "guarantor", "self", "state", "work" and "birth" are each assigned with an insignificance token label (e.g., shown as "other" in FIG. 6), thereby indicating that each of the such word-level tokens 602 are not demographic words that may be used to predict an identifier of a healthcare provider. FIG. 6 further illustrates a barcode and a unique identifiers 606 for the unstructured textual data object from which the illustrated word-level tokens 602 originate. That is, each word-level token 602 may be associated with an identifier 606 indicating an unstructured textual data object (e.g., a clinical chart barcode) from which the word-level token 602 originated and/or further a portion (e.g., a page of a clinical chart) of the unstructured textual data object from which the word-level token 602 originated. While only word-level tokens 602 from one unstructured textual data object are shown as being labelled with either a significance token label or an insignificance token label, word-levels tokens 602 of each of the plurality of historical unstructured textual data objects are labelled accordingly.

Returning to FIG. 4, process 400 comprises step/operation 403. Step/operation 403 comprises configuring a significance recognition machine learning model to automatically generate an inferred token label for a word-level token 602 using each plurality of word-level tokens 602 with each corresponding ground-truth token label. In other words, a significance recognition machine learning model may be trained in step/operation 403 to automatically generate an inferred token label for each word-level token 602 of an unstructured textual data object in a more efficient manner.

Referring now to FIG. 7, a process 700 is provided and may be an example embodiment of step/operation 403. That is, process 700 comprises steps/operations for configuring (e.g., training) a significance recognition machine learning model to automatically generate an inferred token label for each word-level token 602 of an unstructured textual data object. In various embodiments, system computing entity 106 comprises means, such as processing element 205, memories 210, 215, network interface 220, and/or the like, for performing various operations for configuring (e.g., training) a significance recognition machine learning model, such as the operations described in the context of process 700.

Process 700 comprises step/operation 701, which involves providing each plurality of word-level tokens 602 to the significance recognition machine learning model. Each plurality of word-level tokens 602 corresponds to an unstructured textual data object (e.g., a portion of a clinical chart describing a medical encounter). In various embodiments, the word-level tokens 602 are provided to the significance recognition machine learning model with the ground-truth token labels (e.g., a significance token label, an insignificance token label). In various other embodiments, the word-level tokens 602 are provided to the significance recognition machine learning model at substantially the same time or in parallel with the generating and assigning of ground-truth token labels to each word-level token 602. That is, in some embodiments, some aspects of each of step/operation 402 and step/operation 403 (e.g., process 700) may be performed in parallel.

Process 700 further comprises step/operation 702, which includes generating and assigning an inferred token label to each word-level token 602 using the significance recognition machine learning model. Similar to the ground-truth token label, the inferred token label may be a significance token label or an insignificance token label and may be configured to indicate a significance type and a significance subtype. In various embodiments, the significance recognition machine learning model is specifically initialized and/or configured to process each word-level token 602 to generate an inferred token label. FIG. 8 illustrates the architecture of an example significance recognition machine learning model 800 configured to process each word-level token 602. It will be understood that while a significance recognition machine learning model 800 may be configured as provided in the illustrated embodiment, various configurations and architectures of neural network models, machine learning models, deep learning models, and/or the like may be implemented as a significance recognition machine learning model 800, in various embodiments. As shown, a plurality of word-level tokens 602 are provided to the significance recognition machine learning model 800. For example, individual word-level tokens 602A-E of "dr", "john", "sits", "in", "miami" are provided to the significance recognition machine learning model 800. As may be understood, the word-level tokens 602 may be provided to the significance recognition machine learning model 800 in a sequence as specified in the unstructured textual data object, such that the significance recognition machine learning model 800 may analyze the semantic meaning of the position of a word-level token 602 within surrounding text. In the example of the illustrated embodiment then, word-level tokens 602A-E are provided in the order of "dr", "john", "sits", "in", "miami" as would appear in an unstructured textual data object, as opposed to another order or a random order such as "sits", "miami", "dr", "in", 'john".

In various embodiments, the significance recognition machine learning model 800 is configured to process and analyze the word-level tokens 602 through multiple stages. The significance recognition machine learning model 800 may generally first generate representations for each word-level token 602 at a first stage. Specifically, the significance recognition machine learning model 800 comprises a first embedding stage and a second embedding stage. Each embedding stage may be performed substantially in parallel, in some embodiments. At the first embedding stage, word-level representation data objects 802 are generated for each word-level token 602. Each word-level representation data object 802 may be an embedding of a word-level token 602 within and/or relative to an unstructured textual data object to which the word-level token 602 belongs. As previously described, each of the unstructured textual data objects is padded to have the same number of word-level tokens, and thus, each word-level representation data object 802 may be of the same size or length. In some embodiments for example, each word-level representation data object 802 has one-hundred-and-twenty dimensions. In various embodiments, a word-level representation data object 802 may be generated based at least in part on a configurable word vocabulary and an embedding dimension parameter. According to an example embodiment, a word-level representation data object $z^{word}_{it}$ is generated by using an embedding matrix for each word-level token $w_{it}$ in an unstructured textual data object ($t \in [1, T]$), as shown in Equation 1 provided below:

$$z^{word}_{it} = W^{word}_e \cdot w_{it} \qquad \text{Equation 1}$$

Meanwhile, character-level representation data objects 804 may be generated at the second embedding stage. As should be understood by those of skill in the field to which the present disclosure pertains, a word-level token 602 is composed of one or more characters (e.g., ASCII characters). A character-level representation data object 804 may then be an embedding of a word-level token 602 based at least in part on individual characters that constitute the word-level token 602, and one or more character-level representation data objects 804 may be associated with one word-level token 602. As aforementioned, each word-level token 602 may be padded to be the same length, thereby resulting in each character-level representation data object 804 being the same size, length, dimension, and/or the like. As shown in FIG. 7, the word-level token 602A of "dr" is associated with two character-level representation data objects 804, while the word-level token 602E of "miami" is associated with five character-level representation data objects 804. In various embodiments, the character-level representation data objects 804 have a similar dimensionality as the word-level representation data object 802. For example, each character-level representation data object 804 also has one-hundred-and-twenty dimensions. According to an example embodiment, a character-level representation data object $z^{char}_{kit}$ is generated by using an embedding matrix with a word-level token $w_{it}$ composed by $\{c_{kit}\}$, $k \in [1, K]$ characters, as shown in Equation 2 provided below:

$$z^{char}_{kit} = W^{char}_e \cdot c_{kit} \qquad \text{Equation 2}$$

In various embodiments, the significance recognition machine learning model 800 further processes the word-level representation data objects 802 and the character-level representation data objects 804 through a first processing stage and a second processing stage, respectively. Similar to the first and second embedding stages, the first and second processing stages may be performed substantially in parallel. In various embodiments, the word-level representation data objects 802 for the word-level tokens 602 may be further processed at the first processing stage. Specifically, the word-level representation data objects 802 are processed to capture semantic meaning of each word-level token 602 in relation to other word-level tokens 602 of the same unstructured textual data object. For example, the first processing stage may comprise a bidirectional long short term memory (BiLSTM) network configured to receive a sequence of word-level representation data objects 802 (e.g., based at least in part on an original sequence of corresponding word-level tokens 602) and output a sequential representation data object 806 for each word-level token 602. In some embodiments, the BiLSTM network comprises approximately 60 individual long short term memory (LSTM) units. In various embodiments, the sequential representation data object 806 for a word-level token 602 may be a concatenation of a first meaning of the word-level token 602 in a first direction (e.g., left to right) along the sequence of word-level representation data objects 802 and a second meaning of the word-level token 602 in a second direction (e.g., right to left) along the sequence of word-level representation data objects 802. A sequential representation data object 806 may be understood as the hidden state of a word-level token 602.

Meanwhile, the character-level representation data objects 804 are processed at a second processing stage. Specifically, the character-level representation data objects 804 associated with or corresponding to a word-level token 602 are processed to detect character patterns. In various embodiments, the second processing stage comprises a two-dimensional convolutional neural network (CNN) and average pooling techniques configured to detect character patterns and aggregate one or more character-level representation data objects 804 that correspond to the same word-level token 602. In some embodiments, the two-dimensional CNN may specifically comprise sixty channels. Thus, as shown in FIG. 7, the second processing stage may result in a convolutional representation data object 808 for each word-level token 602. According to an example embodiment, the processing of a character-level representation data object 804 is provided by Equation 3 provided below:

$$z^{char}_{it} = \frac{1}{K}\sum_k Conv(z^{char}_{kit}) \qquad \text{Equation 3}$$

At a consolidation stage, the sequential representation data object 806 and the convolutional representation data object 808 for a word-level token 602 are combined to form a fusion representation data object 810 corresponding to the word-level token 602. In various embodiments, the sequential representation data object 806 and the convolutional representation data object 808 are first concatenated. The concatenations of the sequential representation data objects 806 and the convolutional representation data objects 808 are then processed to encode sequential meaning. Specifically, in various embodiments, such concatenations is provided to another BiLSTM network. The fusion representation data object 810 may then be output by the BiLSTM network and may be a concatenation of a forward (e.g., left to right) sequential interpretation and a backward (e.g., right to left) sequential interpretation of the concatenations of sequential representation data objects 806 and convolutional representation data objects 808. In this second BiLSTM network, approximately 60 individual LSTM units may be used, similar to the first BiLSTM network.

In various embodiments, the fusion representation data object 810 for each word-level token 602 may be further processed through one or more attention stages, or otherwise a multi-level attention stage. The multi-level attention stage may process the fusion representation data objects 810 further based at least in part on the sequential representation data objects 806 (the output of the first processing stage). The multi-level attention stage may first involve using multi-headed self-attention techniques with scaled dot-product attention on the fusion representation data objects 810. In various embodiments, multiple attention heads are specifically used to capture multiple different relationships between word-level tokens 602. Specifically, eight attention heads may be used, in some embodiments. In various embodiments, different matrix parameters or weights are used for each attention head. The multi-level attention stage may subsequently involve global attention using a sequential representation data object 806 corresponding to a word-level token 602 as an attention value for a fusion representation data object 810 corresponding to the same word-level token 602. According to an example embodiment, the processing of the fusion representation data objects $h_{it}$ are provided by the following equations, in which H is the number of attention heads (e.g., eight), $d_k$ is the size of each attention head, and $W_j^Q$, $W_j^K$, $W_j^V$ are different attention matrices for each attention head j, in accordance with the Equations 4-5 provided below:

$$h_{it}^{attn} = \left[h_{it}^{attn\,1}, h_{it}^{attn\,2}, \ldots, h_{it}^{attn\,H}\right] \cdot W_O \quad \text{Equation 4}$$

$$h_{it}^{attn\,j} = \text{Softmax}\left(\frac{(h_{it} \cdot W_j^Q) \cdot (h_{it} \cdot W_j^K)^T}{\sqrt{d_k}}\right) \cdot (h_{it} \cdot W_j^V) \quad \text{Equation 5}$$

In various embodiments, the fusion representation data object 810 for each word-level token 602 is further processed through a dense stage to capture long-term dependencies between various word-level tokens 602 or maintain the long-term dependencies captured via the multi-level attention stage. In some embodiments, the dense stage comprises a dropout layer to reduce overfitting of the significance recognition machine learning model 800. For example, the dropout layer may have a dropout probability of 0.2. In some embodiments, the dense stage further comprises a feed forward network (FFN). After the dense stage, the significance recognition machine learning model 800 may generate a token label for each word-level token 602 using a corresponding fusion representation data object 810. In various embodiments, a token label is decoded from a fusion representation data object 810 using a softmax function. Thus with the use of word-level representation data objects 802, character-level representation data objects 804, consolidation of the same, and a multi-level attention stage, the significance recognition machine learning model 800 may be understood as a multi-level hierarchical attention model with word-character fusion representation (MHAWC), in various embodiments. As should be understood, the MHAWC model described herein may be an exemplary embodiment of a significance recognition machine learning model 800; however, other models configured to recognize, identify, label, and/or extract significant information from text may be appropriately used in some embodiments of the present disclosure.

As shown in FIG. 8, the significance recognition machine learning model 800 may generate a significance token label indicating a name significance subtype 604A for each of word-level token 602A of "dr" and word-level token 602B of "john", a significance token label indicating an address significance subtype 604B for the word-level token 602E of "miami", and an insignificance token label indicating a null significance subtype 604C for each of the word-level token 602C of "sits" and the word-level token 602D of "in". Thus, the significance recognition machine learning model 800 may process each word-level token 602 to generate an inferred token label indicating a significance type and a significance subtype.

Returning to FIG. 7, process 700 comprises step/operation 703, which involves comparing the inferred token label (e.g., generated by the significance recognition machine learning model 800) and the ground-truth token label (e.g., generated using the reference data structure and the external datasets) for each word-level token 602. In various embodiments, the significance recognition machine learning model 800 may be untrained and thus, the inferred token label generated for a word-level token 602 may not be accurate or at least may be different than the ground-truth token label. Accordingly, the comparison between the inferred token label and the ground-truth token label for a word-level token 602 may be used to configured or train the significance recognition machine learning model 800 to accurately, automatically, independently, and generally generate token labels for word-level tokens 602. In various embodiments, the inferred token label and the ground-truth token label for a word-level token 602 are compared using categorical cross-entropy loss or softmax loss. However, it will be understood that in various other embodiments, other loss functions may be used to compare the inferred token label and the ground-truth token label.

At step/operation 704 then, the significance recognition machine learning model 800 may be modified based at least in part on the comparison (e.g., categorical cross-entropy loss) between the inferred token label and the ground-truth token label of each word-level token 602. Various weights and parameters of the significance recognition machine learning model 800 may be modified, updated, adjusted, and/or the like. For example, matrix parameters or weights for each attention head in the multi-level attention stage and/or weights corresponding to individual LSTM units of BiLSTM networks in the significance recognition machine learning model 800 may be adjusted.

In various embodiments then, process 700 may be performed multiple times or in multiple iterations to repeatedly configure and train the significance recognition machine learning model 800 until various configurable conditions. The various configurable conditions may include a maximum number of iterations and/or a loss or convergence threshold. As a result, the significance recognition machine learning model 800 may then be configured or trained to automatically generate an accurate token label, and each word-level token 602 may be assigned with an inferred token label that may be substantially similar to the ground-truth token label. In various embodiments, only word-level tokens 602 assigned with ground-truth token labels indicating significance (and not insignificance) are provided to the significance recognition machine learning model 800 in later iterations to focus the significance recognition machine learning model 800 on significant information and to reduce overfitting of the significance recognition machine learning model 800. For example, only word-level tokens 602 assigned with significant ground-truth token labels are provided to the significance recognition machine learning model 800 for iterations after half of the maximum number of iterations.

Returning to FIG. 4, process 400 comprises step/operation 404. Step/operation 404 comprises generating a label-based feature data object for each unstructured textual data object based at least in part on the inferred token label for each word-level token 602 of each unstructured textual data object. As described, the inferred token label for a word-level token 602 may be either a significance token label (and further indicating a significance subtype) or an insignificance token label (indicating a null significance subtype). In various embodiments, the label-based feature data object for an unstructured textual data object is generated using only word-level tokens 602 of the unstructured textual data object assigned with a significance token label. Referring to the earlier example in the context of the exemplary application, a label-based feature data object may be generated for an unstructured textual data object comprising the text of "dr john sits in miami" using only the word-level tokens 602 for "dr", "john", and "miami" (with both "dr" and "john" being of a name significance subtype 604A and "miami" being of an address significance subtype 604B). Further, the label-based feature data object may be generated based at least in part on (e.g., include features or elements corresponding to) a significance subtype 604 of each word-level token 602 assigned with a significance token label.

In various embodiments, the label-based feature data object for an unstructured textual data object is generated based at least in part on character co-occurrences within the word-level tokens 602 assigned with a significance token label. Specifically, n-gram Term Frequency-Inverse Document Frequency (TF-IDF) may be used to generate a label-based feature data object for an unstructured textual data object, in various embodiments. Using the earlier example, 1-gram TF-IDF may result in a label-based feature with weights for character features of "d", "r", "j", "o", "h", "n", "m", "i", "a", "m", and "i", while 2-gram TF-IDF may result in a label-based feature with weights for character features for "dr", "jo", "oh", "hn", and so on. In some embodiments specifically, the label-based feature data object comprises features extracted from the word-level tokens 602 labelled as significant based at least in part on 1-gram, 2-gram, and 3-gram TF-IDF.

In various embodiments, the label-based feature data object may be additionally or alternatively generated with contextually meaningful information extracted. For example, Word2Vec techniques may be used to generate embeddings for the word-level tokens 602 with a significance token label. In some embodiments, the embeddings generated from the Word2Vec techniques may be aggregated or combined with the label-based feature data object generated based at least in part on character co-occurrences. In various embodiments, high-dimensional embeddings may be generated for each word-level token 602 with respect to the one or more external datasets to handle out-of-vocabulary (OOV) words. For example, fastText techniques may be used to generate one-hundred dimensional embeddings based at least in part on each reference token from an external dataset. In general then, a label-based feature data object may be generated based at least in part on various techniques, methods, and combinations thereof.

Process 400 comprises step/operation 405, which comprises generating or updating a prediction machine learning model based at least in part on the label-based feature data object and the prediction annotation associated with each unstructured textual data object. In various embodiments, the prediction machine learning model may be generated, updated, configured, trained, and/or the like to generate a prediction data object for an unstructured textual data object. Specifically, the prediction machine learning model may be generated, updated, configured, trained, and/or the like to generally receive a label-based feature data object for an unstructured textual data object and generate a prediction data object based at least in part on the label-based feature data object. In various embodiments, the prediction machine learning model may be a graph-based model. In some embodiments, the prediction machine learning model may be and/or may comprise a k-nearest graph or a k-nearest neighbor (KNN) model, in which each node is arranged based at least in part on a label-based feature data object and corresponds to an unstructured textual data object with its prediction annotation, and k number of the nearest nodes are connected to each node via edges. To determine distance and to identify nearest nodes, Euclidian distance may be used, in some embodiments. Furthermore, in some embodiments, k is one; that is, only the first nearest node is connected to each node. Thus, with the k-nearest graph, a prediction annotation may be found for an unstructured textual data object based at least in part on locating a corresponding node using the label-based feature data object for the unstructured textual data object. Accordingly, the k-nearest graph may be configured to generate a prediction data object based at least in part on a prediction annotation determined using an input label-based feature data object. In various embodiments, the prediction machine learning model comprises one or more graph-based mechanism (e.g., one or more k-nearest graphs). Each of the one or more graph-based mechanisms may be generated, configured, updated, and/or the like to have a different scope, or comprise a different number of nodes for different label-based feature data objects.

In some other embodiments, various other techniques or models may be used to associate the prediction annotation for an unstructured textual data object with the label-based feature data object for the unstructured textual data object. In some embodiments for example, a logistic regression model may be used to associate a prediction annotation with a corresponding label-based feature data object and further generate a prediction data object based at least in part on a prediction annotation determined using an input label-based feature data object. In other example embodiments, an artificial neural network (ANN) model may be used to learn a relationship between prediction annotations and corresponding label-based feature data object and thereby generate a prediction data object when provided with an input label-based feature data object. In further various embodiments, graph neural network models may generally be used to enable efficient traversal of large magnitudes of data. In general, it will be appreciated that any suitable machine learning model may be implemented in various embodiments to associate a prediction annotation with a label-based feature data object. For example, classification machine learning models and/or classification neural network models may be trained to associate a prediction annotation with a label-based feature data object and classify a received label-based feature data object with a prediction based at least in part on an associated prediction annotation.

Thus, with step/operation 405, a prediction machine learning model is generated, updated, configured, trained, and/or the like using a label-based feature data object and a prediction annotation for each unstructured textual data object to generate a prediction data object for an input label-based feature data object. Referring to the exemplary application, the prediction machine learning model is trained using a label-based feature data object and a prediction annotation for each unstructured textual data object, wherein the prediction annotation may be a manually assigned (e.g., via user input) identifier for a healthcare provider rendering healthcare services in a medical encounter described by a corresponding unstructured textual data object. In the exemplary application then, the prediction machine learning model is then trained to generate a prediction data object that may be and/or may comprise a predicted identifier for a rendering healthcare provider for an input unstructured textual data object based at least in part on being provided with a label-based feature data object for the input unstructured textual data object. With at least the significance recognition machine learning model 800 and the prediction machine learning model being configured (e.g., trained) through process 400, the significance-based prediction system 101 may be initialized and configured to generate a prediction data object for an input unstructured textual data object.

As previously mentioned, process 400 or at least some steps/operations of process 400 may be performed for each of one or more external datasets. In various embodiments, at least step/operation 405 may be performed for each of one or more external datasets such that one or more graph-based mechanisms of the prediction machine learning model may be generated and/or configured (e.g., trained) using different external datasets. Thus, for example, a first graph-based mechanism of the prediction machine learning model may be configured to generate prediction data objects for, or otherwise process, a first number or set of different label-based feature data objects, while a second graph-based mechanism of the prediction machine learning model may be configured to generate prediction data objects for, or otherwise process, a second number or set of different label-based feature data objects. Accordingly, various embodiments provide for expandable and flexible generation of prediction data objects. For example, if a particular label-based feature data object is outside the scope of a first graph-based mechanism and a prediction data object for the particular label-based feature data object cannot be generated, the particular label-based feature data object may instead be provided to a second graph-based mechanism with a different scope.

Accordingly, by utilizing machine learning models that are trained in accordance with the techniques described above, various embodiments of the present disclosure address technical challenges related to generating a prediction based at least in part on significant information in unstructured text. Various embodiments of the present disclosure may be configured to, for example, predict an identifier of a healthcare provider rendering services in a medical encounter described by an unstructured textual data object based at least in part on demographic word-level tokens (the significant information) within the unstructured textual data object. In such applications, the identifier of the healthcare provider may be a National Provider Identifier (NPI) or some federated, global, or unique identifier (e.g., GUID, UIUD, hash). Further, such identifiers for a large population of healthcare providers may be stored in external datasets of large magnitude. Various embodiments may be configured to identify such significant information (e.g., demographic word-level tokens) within unstructured textual data objects and further use the identified significant information to generate a prediction. The identification of significant information may be accomplished using a significance recognition machine learning model that may be trained using reference data structures generated using one or more external datasets, and generation of a prediction data object using significant information identified or extracted from an unstructured textual data object may be accomplished using a prediction machine learning model. Accordingly, various embodiments enable the improved and intelligent prediction and labelling of an identifier for a healthcare provider without parsing or processing large magnitudes of data in external datasets to locate a single identifier.

Exemplary Prediction Operations

Referring now to FIG. 9, an example process 900 is provided, the process 900 including steps/operations for generating a prediction data object for an input unstructured textual data object. In various embodiments, system computing entity 106 comprises means, such as processing element 205, memories 210, 215, network interface 220, and/or the like, for performing various operations for generating a prediction data object for an input unstructured textual data object, such as the operations described in the context of process 900.

Process 900 comprises step/operation 901, which includes receiving an input unstructured textual data object. In some embodiments, process 900 begins with and/or is automatically triggered by step/operation 901. In various embodiments, the input unstructured textual data object may be received via an API call, API query, API request, and/or similar terms used herein interchangeably. In such embodiments, the API call may comprise the input unstructured textual data object and may originate from a client computing entity 102. In various embodiments, the input unstructured textual data object is received via a user interface of the system computing entity 106 and/or the client computing entity 102.

Referring again to the exemplary application, the input unstructured textual data object may be, may describe, and/or may be otherwise associated with a clinical chart for a patient or a portion of a clinical chart for a patient describing a medical encounter experienced by the patient with a rendering healthcare provider. The input unstructured textual data object may be provided to (e.g., received by) the significance-based prediction system 101 (and specifically the system computing entity 106) to rapidly, efficiently, and accurately determine an identifier for the rendering healthcare provider in the medical encounter described by the input unstructured textual data object. In various embodiments, the significance-based prediction system 101 bears technical advantages when compared to existing methods and systems, which may involve manual analysis (e.g., by a user or operator) of the clinical and manual reference through an external dataset to manually determine an identifier for the rendering healthcare provider. That is, as previously described (e.g., in the context of process 400), the significance-based prediction system 101 may be initialized to automatically generate a prediction data object that may be and/or may comprise a predicted identifier for the rendering healthcare provider when provided with an input unstructured textual data object.

In various embodiments, the input unstructured textual data object comprises unstructured or free text. The text of the input unstructured textual data object may be generated using various techniques or systems, such as an OCR system, an audio transcription system, user input, and/or the like. Accordingly, in various instances and example, the input unstructured textual data object may be an image or scan of text, an audio recording, a data object comprising various characters constituting a text, and/or the like, and as such, receiving the input unstructured textual data object comprises generating text for the input unstructured textual data object, in some embodiments.

Process 900 may then comprise step/operation 902, which involves generating a plurality of word-level tokens 602 for the input unstructured textual data object. As described, the input unstructured textual data object may comprise text (and/or text may be generated for the input unstructured textual data object). In various embodiments, generating a plurality of word-level tokens 602 comprises pre-processing the input unstructured textual data object and/or the text of the input unstructured textual data object. Pre-processing the input unstructured textual data object may comprise converting all upper case characters to lower case characters and removing special characters. Subsequently, word-level tokens 602 may be generated using various tokenization techniques or methods and may be generated based at least in part on various delimiters (e.g., spaces, tabs, periods, commas, line breaks) that separate word-level tokens 602.

Process 900 comprises step/operation 903, which comprises providing the plurality of word-level tokens 602 to a significance recognition machine learning model 800 configured to assign a token label to each word-level token 602. The assigned token label for a word-level token 602 may be either a significance token label (further indicating a significance subtype 604) or an insignificance token label (indicating a null significance subtype). In various embodiments, the significance recognition machine learning model 800 is trained (e.g., as described in process 400) to automatically generate and assign token labels to each word-level token 602 of an unstructured textual data object and to identify a significance type (e.g., demographic information, insignificance) and a significance subtype for each word-level token 602. Specifically, the significance recognition machine learning model 800 may process each word-level token 602 through various stages with trained parameters and weights. As previously described and shown in FIG. 8, the significance recognition machine learning model 800 may be a MHAWC model and may generate a fusion representation data object 810 for each word-level token 602 based at least in part on a word-level representation data object 802 and a character-level representation data object 804 for each word-level token 602. The significance recognition machine learning model 800 may also encode sequential information into the fusion representation data object 810 for each word-level token 602 (e.g., based at least in part on the position of a word-level token 602 within the unstructured textual data object relative to other word-level tokens 602) via one or more BiLSTM networks and may further use a multi-level attention stage to further emphasize or weight (e.g., using trained parameters) important word-level tokens 602.

In the exemplary application wherein the input unstructured textual data object is a clinical chart (or a portion thereof) describing a medical encounter with a rendering healthcare provider, word-level tokens 602 of the text of the clinical chart that describe demographic information specific to the rendering healthcare provider are recognized, identified, labelled, extracted, and/or the like. For example, word-level tokens 602 that describe the name, address, telephone number, zip code, and/or the like of the rendering healthcare provider are assigned with significance token labels. Advantageously, due to the configuration and training of the significance recognition machine learning model 800, word-level tokens 602 that describe similar demographic information for other entities, such as the patient of the medical encounter, may not be assigned with significance token labels. Thus, word-level tokens 602 specific to the prediction task (e.g., identifying the rendering healthcare provider) are accurately and precisely labelled.

Process 900 may then comprise step/operation 904, which comprises generating a label-based feature data object for the input unstructured textual data object based at least in part on the token labels assigned to each word-level token 602 using the significance recognition machine learning model 800. In various embodiments, the label-based feature data object may be specifically based at least in part on word-level tokens 602 assigned with significance token labels. Similar to the label-based feature data objects generated for each of the plurality of unstructured textual data objects described in the context of process 400, the label-based feature data object for the input unstructured textual data object may be generated using various techniques, methods, and combinations thereof, including n-gram TF-IDF techniques, Word2Vec techniques, and fastText techniques. Further, the label-based feature data object may be generated based at least in part on (e.g., include features or elements corresponding to) a significance subtype 604 of each word-level token 602 assigned with a significance token label.

Process 900 then comprises step/operation 905, which comprises generating a prediction data object using a prediction machine learning model and the label-based feature data object for the input unstructured textual data object. The prediction machine learning model may be configured (e.g., trained) to generate a prediction data object based at least in part on being provided with a label-based feature data object, as previously described in the context of process 400. In various embodiments, the prediction machine learning model may be and/or may comprise a KNN graph-based mechanism, and a KNN graph may be traversed using the label-based feature data object to locate a prediction annotation associated with the label-based feature data object or associated with a substantially similar label-based feature data object. Then, the prediction data object may be, may comprise, and/or may be based at least in part on the located prediction annotation. In the exemplary application for example, the prediction data object may comprise a predicted identifier for the rendering healthcare provider described in the input unstructured textual data object based at least in part on a traversal of the KNN graph to locate or identify an annotated identifier of a healthcare provider associated with a label-based feature data object substantially similar to the label-based feature data object of the input unstructured textual data object. In various embodiments, the prediction data object comprises a confidence score that may indicate a computed probability or an estimated accuracy associated with the prediction data object.

In various embodiments, the prediction machine learning model may indicate, responsive to being provided with a label-based feature data object, that a prediction data object cannot be accurately generated or that the label-based feature data object cannot be accurately processed. For example, the processing of the label-based feature data object may require an undesired amount of extrapolation by the prediction machine learning model, or the prediction machine learning model may not be capable of processing the label-based feature data object. That is, in some instances, the label-based feature data object may be outside the scope or range of the prediction machine learning model. As previously described, the prediction machine learning model may comprise one or more graph-based mechanism (e.g., a KNN graph), and a node for the label-based feature data object or substantially similar to the label-based feature data object may not exist within the prediction machine learning model.

In such instances, a second graph-based mechanism may be selected, wherein the second graph-based mechanism has a larger or a different scope. The second graph-based mechanism may be configured (e.g., trained) using a different external dataset that contains more information. In the exemplary application for example, a first external dataset used in configuring a first graph-based mechanism may comprise demographic information and identifiers for onethousand healthcare providers, while a second external dataset used in configuring a second graph-based mechanism may comprise demographic information and identifiers for one-million healthcare providers. Accordingly, such a second graph-based mechanism may be more suitable for generating a prediction data object if the first graph-based mechanism is incapable of doing the same. Thus, in various embodiments, generating a prediction data object may comprise determining that the first graph-based mechanism may not be configured to generate a prediction data object for the provided label-based feature data object, selecting a second graph-based mechanism, and providing the label-based feature data object to the second graph-based mechanism to generate the prediction data object. Thus, various technical advantages are provided herein. By first using a first graph-based mechanism of a relatively smaller scope or range, processing time and resources (e.g., for traversing a graph of the first prediction machine learning model) are conserved if a prediction data object can be generated for the label-based feature data object and the label-based feature data object is within a scope of the first graph-based mechanism. As such, various embodiments provide for an expandable and flexible generation of a prediction data object for a label-based feature data object.

Next, the process 400 comprises step/operation 906, which includes performing one or more automated prediction-based actions, or specifically one or more actions based at least in part on the prediction data object. In various embodiments, the one or more actions comprise providing the prediction data object to a client computing entity 102. Specifically, an API response comprising the prediction data object may be transmitted such that a client computing entity 102 receives the API response. For example, the API response may be responsive to an API query received originating from a client computing entity 102. In various embodiments, the prediction data object may be additionally or alternatively displayed via a user interface of the system computing entity 106 and/or the client computing entity 102. In the exemplary application for example, the predicted identifier for a rendering healthcare provider may be provided to a user via a user interface.

In various embodiments, the one or more prediction-based actions comprise further processing the unstructured textual data object and/or the prediction data object to further configure the significance recognition machine learning model 800 and/or the prediction machine learning model. In some instances, the prediction data object and the unstructured textual data object may be manually reviewed and may be compared with a manual determination for the prediction task. The comparison may then be further used to configured at least one of the significance recognition machine learning model 800 and/or the prediction machine learning model. In the exemplary application for example, a predicted identifier of a rendering healthcare provider for the unstructured textual data object may be compared with a manually determined identifier of a rendering healthcare provider for the unstructured textual data object, and the significance-based prediction system 101 may be further configured based at least in part on the comparison.

Other examples of prediction-based actions include generating one or more notifications (e.g., one or more physician notifications, one or more claim reviewer notifications, and/or the like) based at least in part on the prediction data object, one or more alerts (e.g., one or more physician alerts, one or more claim reviewer alerts, and/or the like) based at least in part on the prediction data object, automatically scheduling one or more appointments based at least in part on the prediction data object, automatically generating one or more prescriptions based at least in part on the prediction data object, automatically generating one or more work orders based at least in part on the prediction data object, and/or the like.

Accordingly, by utilizing the above-described techniques, various embodiments of the present disclosure provide technical advantages by accurately and precisely recognizing significant information within an unstructured textual data object. In the exemplary application for example, demographic information specific to a healthcare provider rendering healthcare services is recognized in order to generate a prediction of an identifier for said healthcare provider. Existing methods and systems relating to extracting information from unstructured text are not capable of information recognition of such high precision and may also identify demographic information of a patient, another healthcare provider, and other parties involved and described in an unstructured textual data object (e.g., false positives). Thus, it may be understood that various embodiments are uniquely configured to reduce the number of false positives (e.g., insignificant information incorrectly identified as significant) when labelling significant word-level tokens. Even further, various embodiments are also uniquely configured to reduce the number of false negatives when labelling significant word-level tokens. Due to possible signal noise and errors that may exist in the unstructured textual data object, various embodiments use similarity values and thresholds to also label significant information that may be misspelled, mistranslated, or otherwise imperfect. By reducing these false negative occurrences as well as false positive occurrences, various embodiments uniquely and advantageously recognize, identify, label, extract, and/or the like accurate and precise significant information for use in generating a prediction.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising:
  receiving, by one or more processors and originating from a client computing entity, an application programming interface (API) request that identifies an input unstructured textual data object;
  generating, by the one or more processors, a plurality of word-level tokens for the input unstructured textual data object;
  determining, by the one or more processors using a significance recognition machine learning model, a significance type for a word-level token of the plurality of word-level tokens by:
   (i) determining a word-level embedding for the word-level token,
   (ii) determining a character-level embedding for the word-level token, (iii) determining a fusion representation data object for the word-level token based at least in part on a combination of the word-level embedding and the character-level embedding, and (iv) determining the significance type for the word-level token based at least in part on the fusion representation data object for the word-level token;

assigning, by the one or more processors, a significance token label to the word-level token based at least in part on the significance type;

generating, by the one or more processors, a label-based feature data object for the input unstructured textual data object based at least in part on a subset of word-level tokens from the plurality of word-level tokens that is associated with the significance token label;

generating, by the one or more processors and a prediction machine learning model, a prediction data object for the input unstructured textual data object based at least in part on the label-based feature data object;

providing, by the one or more processors and to the client computing entity, an API response that identifies the prediction data object; and initiating, by the one or more processors, the performance of one or more automated prediction-based actions based at least in part on the prediction data object.

2. The computer-implemented method of claim 1, wherein the significance recognition machine learning model determines the significance type of the word-level token by:

generating the word-level embedding for the word-level token based at least in part on a comparison between the word-level token and the plurality of word-level tokens;

generating the character-level embedding for the word-level token based at least in part on one or more characters within the word-level token; and applying one or more attention mechanisms to the fusion representation data object to determine the significance type of the word-level token.

3. The computer-implemented method of claim 2, wherein the significance recognition machine learning model comprises a first bidirectional long short term memory mechanism configured to generate the word-level embedding for the word-level token and a second bidirectional long short term memory mechanism configured to generate the fusion representation data object for the word-level token.

4. The computer-implemented method of claim 1, wherein the significance recognition machine learning model is trained using a plurality of historical word-level tokens in a historical unstructured textual data object of a plurality of unstructured textual data objects by:

generating a ground-truth token label for a historical word-level token of the plurality of historical word-level tokens;

generating an inferred token label using the significance recognition machine learning model; and updating the significance recognition machine learning model based at least in part on a comparison between the ground-truth token label and the inferred token label.

5. The computer-implemented method of claim 4, wherein the ground-truth token label for the historical word-level token is based at least in part on a similarity value between the historical word-level token and each of a plurality of reference tokens respectively corresponding to a plurality of significance subtypes.

6. The computer-implemented method of claim 1, wherein:

the prediction machine learning model comprises a plurality of graph-based prediction mechanisms, and generating the prediction data object for the input unstructured textual data object comprises:

determining that the label-based feature data object is not one of a first plurality of different label-based feature data objects associated with a first graph-based prediction mechanism of the plurality of graph-based prediction mechanisms;

selecting a second graph-based prediction mechanism associated with a second plurality of different label-based feature data objects; and generating the prediction data object for the input unstructured textual data object based at least in part on the second graph-based prediction mechanism.

7. The computer-implemented method of claim 6, wherein each of the plurality of graph-based prediction mechanisms comprises a traversable k-nearest neighbor graph using Euclidean distance between each of a plurality of different label-based feature data objects, and wherein k is one.

8. The computer-implemented method of claim 6, wherein the first plurality of different label-based feature data objects associated with the first graph-based prediction mechanism is obtained from a first external dataset, and the second plurality of different label-based feature data objects associated with the second graph-based prediction mechanism is obtained from a second external dataset.

9. The computer-implemented method of claim 1, wherein the significance token label indicates that the word-level token describes demographic information for a healthcare provider rendering healthcare services in a medical encounter described by the input unstructured textual data object.

10. The computer-implemented method of claim 1, wherein the prediction data object comprises an identifier for a healthcare provider rendering healthcare services in a medical encounter described by the input unstructured textual data object.

11. A system comprising memory and one or more processors communicatively coupled to the memory, the one or more processors configured to:

receive, originating from a client computing entity, an application programming interface (API) request that identifies an input unstructured textual data object;

generate a plurality of word-level tokens for the input unstructured textual data object;

determine, using a significance recognition machine learning model, a significance type for a word-level token of the plurality of word-level tokens by:

(i) determining a word-level embedding for the word-level token, (ii) determining a character-level embedding for the word-level token, (iii) determining a fusion representation data object for the word-level token based at least in part on a combination of the word-level embedding and the character-level embedding, and (iv) determining the significance type for the word-level token based at least in part on the fusion representation data object for the word-level token;

assign a significance token label to the word-level token based at least in part on the significance type;

generate a label-based feature data object for the input unstructured textual data object based at least in part on a subset of word-level tokens from the plurality of word-level tokens that is associated with the significance token label;

generate, using a prediction machine learning model, a prediction data object for the input unstructured textual data object based at least in part on the label-based feature data object;

provide, to the client computing entity, an API response that identifies the prediction data object; and initiate the performance of one or more automated prediction-based actions based at least in part on the prediction data object.

12. The system of claim 11, wherein the significance recognition machine learning model determines the significance type of the word-level token by:

generating the word-level embedding for the word-level token based at least in part on a comparison between the word-level token and the plurality of word-level tokens;

generating the character-level embedding for the word-level token based at least in part on one or more characters within the word-level token; and applying one or more attention mechanisms to the fusion representation data object to determine the significance type of the word-level token.

13. The system of claim 12, wherein the significance recognition machine learning model comprises a first bidirectional long short term memory mechanism configured to generate the word-level embedding for the word-level token and a second bidirectional long short term memory mechanism configured to generate the fusion representation data object for the word-level token.

14. The system of claim 11, wherein the significance recognition machine learning model is trained using a plurality of historical word-level tokens in a historical unstructured textual data object of a plurality of unstructured textual data objects by:

generating a ground-truth token label for a historical word-level token of the plurality of historical word-level tokens;

generating an inferred token label using the significance recognition machine learning model; and updating the significance recognition machine learning model based at least in part on a comparison between the ground-truth token label and the inferred token label.

15. The system of claim 14, wherein the ground-truth token label for the historical word-level token is based at least in part on a similarity value between the historical word-level token and each of a plurality of reference tokens respectively corresponding to a plurality of significance subtypes.

16. The system of claim 11, wherein:

the prediction machine learning model comprises a plurality of graph-based prediction mechanisms, and to generate the prediction data object for the input unstructured textual data object, the one or more processors are configured to:

determine that the label-based feature data object is not one of a first plurality of different label-based feature data objects associated with a first graph-based prediction mechanism of the plurality of graph-based prediction mechanisms;

select a second graph-based prediction mechanism associated with a second plurality of different label-based feature data objects; and generate the prediction data object for the input unstructured textual data object based at least in part on the second graph-based prediction mechanism.

17. The system of claim 16, wherein each of the plurality of graph-based prediction mechanisms comprises a traversable k-nearest neighbor graph using Euclidean distance between each of a plurality of different label-based feature data objects, and wherein k is one.

18. The system of claim 16, wherein the first plurality of different label-based feature data objects associated with the first graph-based prediction mechanism is obtained from a first external dataset, and the second plurality of different label-based feature data objects associated with the second graph-based prediction mechanism is obtained from a second external dataset.

19. One or more non-transitory computer-readable storage media including instructions that, when executed by one or more processors, cause the one or more processors to:

receive, originating from a client computing entity, an application programming interface (API) request that identifies an input unstructured textual data object;

generate a plurality of word-level tokens for the input unstructured textual data object;

determine, using a significance recognition machine learning model, a significance type for a word-level token of the plurality of word-level tokens by:

(i) determining a word-level embedding for the word-level token, (ii) determining a character-level embedding for the word-level token, (iii) determining a fusion representation data object for the word-level token based at least in part on a combination of the word-level embedding and the character-level embedding, and (iv) determining the significance type for the word-level token based at least in part on the fusion representation data object for the word-level token;

assign a significance token label to the word-level token based at least in part on the significance type;

generate a label-based feature data object for the input unstructured textual data object based at least in part on a subset of word-level tokens from the plurality of word-level tokens that is associated with the significance token label;

generate, using a prediction machine learning model, a prediction data object for the input unstructured textual data object based at least in part on the label-based feature data object;

provide, to the client computing entity, an API response that identifies the prediction data object; and initiate the performance of one or more automated prediction-based actions based at least in part on the prediction data object.

20. The one or more non-transitory computer-readable storage media of claim 19, wherein the significance recognition machine learning model determines the significance type of the word-level token by:

generating the word-level embedding for the word-level token based at least in part on a comparison between the word-level token and the plurality of word-level tokens;

generating the character-level embedding for the word-level token based at least in part on one or more characters within the word-level token; and applying one or more attention mechanisms to the fusion representation data object to determine the significance type of the word-level token.

\* \* \* \* \*